(12) United States Patent
Wieckowski et al.

(10) Patent No.: US 12,477,107 B2
(45) Date of Patent: *Nov. 18, 2025

(54) ENCODING AND DECODING A PICTURE

(71) Applicant: Fraunhofer-Gesellschaft zur Förderung der angewandten Forschung e.V., Munich (DE)

(72) Inventors: Adam Wieckowski, Berlin (DE); Phan Hoang Tung Nguyen, Berlin (DE); Detlev Marpe, Berlin (DE); Heiko Schwarz, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,078

(22) Filed: Aug. 10, 2023

(65) Prior Publication Data
US 2023/0388496 A1   Nov. 30, 2023

Related U.S. Application Data

(63) Continuation of application No. 17/366,985, filed on Jul. 2, 2021, now Pat. No. 11,770,527, which is a
(Continued)

(30) Foreign Application Priority Data

Jan. 2, 2019   (EP) ..................................... 19150105

(51) Int. Cl.
*H04N 19/119*   (2014.01)
*H04N 19/13*   (2014.01)
(Continued)

(52) U.S. Cl.
CPC ........... *H04N 19/119* (2014.11); *H04N 19/13* (2014.11); *H04N 19/176* (2014.11); *H04N 19/46* (2014.11); *H04N 19/96* (2014.11)

(58) Field of Classification Search
None
See application file for complete search history.

(56) References Cited

U.S. PATENT DOCUMENTS 11,770,527 B2 *   9/2023   Wieckowski .......... H04N 19/46
                                                             375/240.02
2012/0169519 A1   7/2012   Ugur
(Continued)

FOREIGN PATENT DOCUMENTS

CN   107211132 A   9/2017
CN   108464004 A   8/2018
(Continued)

OTHER PUBLICATIONS

Chen, Y.W., et al., "Description of SOR, HOR and 360°video coding technology proposal by Qualcomm and Technicolor—low and high complexity versions", JVET Meeting; Apr. 10, 2018-Apr. 20, 2018; San Diego; (The Joint Video Exploration Team of ISO/IEC JTC1/SC29/WG11 and ITU-T SG.16); URL: http://phenix.int-evry.fr/jvet/, No. JVET-J0021-v5, Apr. 14, 2018 (Apr. 14, 2018), XP030151184, 42 pp.

(Continued)

*Primary Examiner* — Kaitlin A Retallick
(74) *Attorney, Agent, or Firm* — Conley Rose, P.C.

(57)   ABSTRACT

An apparatus for decoding a picture is configured to partition the picture into coding blocks, using recursive multi-tree splitting. Splitting schemes for the multi-tree splitting are described. According to an embodiment, the decoder decodes a split direction flag from a data stream by context adaptive entropy decoding using a context which depends on whether, and discriminates between, a first number of cri- (Continued)

teria which would be fulfilled in case of a split direction indicated by the split direction flag being horizontal equals a second number of criteria which would be fulfilled in case of the split direction indicated by the split direction flag being vertical, the first number being greater than the second number, and the first number being smaller than the second number.

23 Claims, 21 Drawing Sheets

Related U.S. Application Data continuation of application No. PCT/EP2019/087169, filed on Dec. 30, 2019.

(51) Int. Cl.
*H04N 19/176* (2014.01)
*H04N 19/46* (2014.01)
*H04N 19/96* (2014.01)

(56) References Cited

U.S. PATENT DOCUMENTS

| | | |
|---|---|---|
| 2013/0177079 A1 | 7/2013 | Kim |
| 2017/0118486 A1 | 4/2017 | Rusanovskyy |
| 2018/0070110 A1* | 3/2018 | Chuang ................ H04N 19/463 |
| 2018/0103268 A1 | 4/2018 | Huang et al. |
| 2018/0139444 A1 | 5/2018 | Huang |
| 2019/0007686 A1 | 1/2019 | Galpin |
| 2020/0162729 A1* | 5/2020 | Lee ........................ H04N 19/46 |
| 2020/0296366 A1 | 9/2020 | Chono |
| 2021/0099709 A1* | 4/2021 | Nam ...................... H04N 19/96 |

FOREIGN PATENT DOCUMENTS

| | | |
|---|---|---|
| CN | 108702507 A | 10/2018 |
| EP | 3306927 A1 | 4/2018 |
| KR | 10-20130064781 A | 6/2013 |
| TW | 201826800 A | 7/2018 |
| WO | 2015190839 A1 | 12/2015 |
| WO | 2016123169 A1 | 8/2016 |
| WO | 2017205700 A1 | 11/2017 |
| WO | 2018016823 A1 | 1/2018 |
| WO | 2018110462 A1 | 6/2018 |

OTHER PUBLICATIONS

Hsu, et al., "Description of SOR video coding technology proposal by MediaTek," Joint Video Experts Team (JVET) of TU-T SG 16 WP 3 and ISO/IEC JTC 1/SC 29/WG 11, JVET-J0018 (version 2), Apr. 11, 2018, pp. 1-33.

Chen, et al., "Description of SOR, HOR and 360 video coding technology proposal by Qualcomm and Technicolor—low and high complexity versions," Joint Video Exploration Team (JVET) of ITU-T SG16 WP 3 and ISO/IEC JTC 1/SC 29/WG 11, JVET-J0021 (version 5), Apr. 14, 2018, pp. 1-8.

International Search Report and Written Opinion, dated Jun. 3, 2020, PCT Application No. PCT/EP2019/087169, filed Dec. 30, 2019.

* cited by examiner

- 1601: Partitioning the picture into coding blocks 425 using recursive multi-tree splitting depending on splitting information 415 signaled in a data stream 14

- 1511: Decoding a split flag 416 and a quad flag 417 of the splitting information 415 from the data stream 14, wherein the split flag 416 indicates whether a predetermined block 411 of the picture is to be split or not to be split thereby stopping the recursive multi-tree splitting with the predetermined block 411 becoming one of the coding blocks 425, and the quad flag 417 indicates whether the predetermined block 411 of the picture is to be split into four child blocks 412 or not,

- 1622: If the predetermined block 411 of the picture is to be split, but not to be split into four child blocks 412,

- 1661: Decoding a split direction flag 518 from the data stream 14 which indicates whether the predetermined block 411 of the picture is to be split vertically or horizontally, if neither a second nor a third predetermined criterion is fulfilled,
    - Using context adaptive entropy decoding using a second context 552

- 1534: Inferring that the split direction flag 518 indicates that the predetermined block 411 of the picture is to be split vertically, if the second predetermined criterion is fulfilled

- 1535: Inferring that the split direction flag 518 indicates that the predetermined block 411 of the picture is to be split horizontally, if the third predetermined criterion is fulfilled

- 1536: Decoding a triple flag 519 from the data stream 14 which indicates whether the predetermined block 411 of the picture is to be split into three child blocks 412 or into two child blocks 412, if a fourth predetermined criterion is not fulfilled

- 1662: Inferring that the triple flag 519 indicates that the predetermined block 411 of the picture is to be split into two child blocks 412, if the fourth predetermined criterion is fulfilled, and that the triple flag 519 indicates that the predetermined block 411 of the picture is to be split into three child blocks 412 and suppress the decoding of the triple flag 519 from the data stream 14, if a fifth predetermined criterion is fulfilled,

- 1503: If the predetermined block 411 of the picture is to be split, Resuming the recursive multi-tree splitting for the child blocks 412 using even further flags of the splitting information 415,

- 1402: Decoding the picture from coding information 440 which is signaled in the data stream 14 and relates to the coding blocks 425

1800

| | |
|---|---|
| Partitioning the picture into coding blocks 425 using recursive multi-tree splitting depending on splitting information 415 signaled in a data stream 14 | —1801 |

Decoding a split flag 416 and a quad flag 417 of the splitting information 415 from the data stream 14, wherein the split flag 416 indicates whether a predetermined block 411 of the picture is to be split or not to be split thereby stopping the recursive multi-tree splitting with the predetermined block 411 becoming one of the coding blocks 425, and the quad flag 417 indicates whether the predetermined block 411 of the picture is to be split into four child blocks 412 or not —1511

If the predetermined block 411 of the picture is to be split, but not to be split into four child blocks 412, —1823

Decoding a split direction flag 518 from the data stream 14 which indicates whether the predetermined block 411 of the picture is to be split vertically or horizontally —1881

Decoding a triple flag 519 from the data stream 14 which indicates whether the predetermined block 411 of the picture is to be split into three child blocks 412 or into two child blocks 412 —1882

Using context adaptive entropy decoding using a third context 853

If the predetermined block 411 of the picture is to be split, —1503
Resuming the recursive multi-tree splitting for the child blocks 412 using even further flags of the splitting information 415, —1403

Decoding the picture from coding information 440 which is signaled in the data stream 14 and relates to the coding blocks 425 —1402

```
┌─────────────────────────────────────────────────────────────┐
│  Partitioning the picture into coding blocks 425 using recursive    │──1901
│  multi-tree splitting depending on splitting information 415        │
│  signaled in a data stream 14                                       │
│                                                                     │
│   ┌─────────────────────────────────────────────────────┐          │
│   │   Selecting one of a first mode and a second mode   │──1905    │
│   └─────────────────────────────────────────────────────┘          │
│                                                                     │
│   ┌─────────────────────────────────────────────────────┐          │
│   │  Decoding a split flag 416 and a quad flag 417 of the splitting │
│   │  information 415 from the data stream 14, wherein the split flag│
│   │  416 indicates whether a predetermined block 411 of the picture │──1911
│   │  is to be split or not to be split thereby stopping the recursive│
│   │  multi-tree splitting with the predetermined block 411 becoming │
│   │  one of the coding blocks 425, and the quad flag 417 indicates  │
│   │  whether the predetermined block 411 of the picture is to be    │
│   │  split into four child blocks 412 or not,                       │
│   └─────────────────────────────────────────────────────┘          │
│                               ▼                                     │
│   ┌─────────────────────────────────────────────────────┐          │
│   │  If the predetermined block 411 of the picture is to be split,  │──1991
│   │  but not to be split into four child blocks 412                 │
│   │                                                                 │
│   │   ┌───────────────────────────────────────────────┐            │
│   │   │  Decoding one or more further flags 418 of the splitting    │
│   │   │  information 415 from the data stream 14 which indicate     │
│   │   │  whether the predetermined block 411 of the picture         │
│   │   │  is to be split into two or three child blocks 412          │
│   │   │  vertically or horizontally                                 │
│   │   └───────────────────────────────────────────────┘            │
│   └─────────────────────────────────────────────────────┘          │
│                                                                     │
│   ┌─────────────────────────────────────────────────────┐          │
│   │  If the predetermined block 411 of the picture is to be split,  │──1503
│   │   ┌───────────────────────────────────────────────┐            │
│   │   │  Resuming the recursive multi-tree splitting for the child blocks│
│   │   │  412 using even further flags of the splitting information 415  │
│   │   └───────────────────────────────────────────────┘            │
│   └─────────────────────────────────────────────────────┘          │
└─────────────────────────────────────────────────────────────┘
                                ▼
┌─────────────────────────────────────────────────────────────┐
│  Decoding the picture from coding information 440 which is signaled │──1402
│  in the data stream 14 and relates to the coding blocks 425         │
└─────────────────────────────────────────────────────────────┘
```

Fig. 18

| QT | quadtree depth < 2 | area > threshold | $W > W_{above}$ | $H > H_{left}$ | context model index |
|---|---|---|---|---|---|
| 1 | 0 | N/A | 0 | 0 | 0 |
| 1 | 0 | N/A | 1 | 0 | 1 |
| 1 | 0 | N/A | 0 | 1 | 1 |
| 1 | 0 | N/A | 1 | 1 | 2 |
| 1 | 1 | N/A | 0 | 0 | 3 |
| 1 | 1 | N/A | 1 | 0 | 4 |
| 1 | 1 | N/A | 0 | 1 | 4 |
| 1 | 1 | N/A | 1 | 1 | 5 |
| 0 | N/A | 0 | 0 | 0 | 6 |
| 0 | N/A | 0 | 1 | 0 | 7 |
| 0 | N/A | 0 | 0 | 1 | 7 |
| 0 | N/A | 0 | 1 | 1 | 8 |
| 0 | N/A | 1 | 0 | 0 | 9 |
| 0 | N/A | 1 | 1 | 0 | 10 |
| 0 | N/A | 1 | 0 | 1 | 10 |
| 0 | N/A | 1 | 1 | 1 | 11 |

Fig. 19

| $N_s/3$ (integer division) | $W > W_{above}$ | $H > H_{left}$ | context model index |
|---|---|---|---|
| 0 | 0 | 0 | 0 |
| 0 | 1 | 0 | 1 |
| 0 | 0 | 1 | 1 |
| 0 | 1 | 1 | 2 |
| 1 | 0 | 0 | 3 |
| 1 | 1 | 0 | 4 |
| 1 | 0 | 1 | 4 |
| 1 | 1 | 1 | 5 |
| 2 | 0 | 0 | 6 |
| 2 | 1 | 0 | 7 |
| 2 | 0 | 1 | 7 |
| 2 | 1 | 1 | 8 |

Fig. 20

| $W==H$ | $W>H$ | $BH+TH$ | $BV+TV$ | current VCC context index | modified context index |
|---|---|---|---|---|---|
| 1 | 0 | 2 | 2 | 0 | 0 |
| 0 | 1 | 2 | 2 | 1 | 1 |
| 0 | 0 | 2 | 2 | 2 | 2 |
| 1 | 0 | 1 | 1 | 0 | 0 |
| 0 | 1 | 1 | 1 | 1 | 1 |
| 0 | 0 | 1 | 1 | 2 | 2 |
| 1 | 0 | 2 | 1 | 0 | 3 |
| 0 | 1 | 2 | 1 | 1 | 3 |
| 0 | 0 | 2 | 1 | 2 | 3 |
| 1 | 0 | 1 | 2 | 0 | 4 |
| 0 | 1 | 1 | 2 | 1 | 4 |
| 0 | 0 | 1 | 2 | 2 | 4 |

Fig. 21

| left avail. | above avail. | $d_0 == d_1$ | $d_0 < d_1$ | BH+TH | BV+TV | modified context index |
|---|---|---|---|---|---|---|
| N/A | N/A | N/A | N/A | 1 | 2 | 3 |
| N/A | N/A | N/A | N/A | 2 | 1 | 4 |
| 0 | 0 | N/A | N/A | 1 | 1 | 0 |
| 1 | 0 | N/A | N/A | 1 | 1 | 0 |
| 0 | 1 | N/A | N/A | 1 | 1 | 0 |
| 1 | 1 | 1 | 0 | 1 | 1 | 0 |
| 1 | 1 | 0 | 0 | 1 | 1 | 1 |
| 1 | 1 | 0 | 1 | 1 | 1 | 2 |
| 0 | 0 | N/A | N/A | 2 | 2 | 0 |
| 1 | 0 | N/A | N/A | 2 | 2 | 0 |
| 0 | 1 | N/A | N/A | 2 | 2 | 0 |
| 1 | 1 | 1 | 0 | 2 | 2 | 0 |
| 1 | 1 | 0 | 0 | 2 | 2 | 1 |
| 1 | 1 | 0 | 1 | 2 | 2 | 2 |

Fig. 22

| BT-depth | mtt_split_vertical_flag | current VCC context index | modified context index |
|---|---|---|---|
| < 2 | 0 | 0 | 0 |
| < 2 | 1 | 0 | 1 |
| ≥ 2 | 0 | 0 | 2 |
| ≥ 2 | 1 | 0 | 3 |

Fig. 23

ENCODING AND DECODING A PICTURE

CROSS-REFERENCES TO RELATED APPLICATIONS

This application is a continuation of U.S. patent application Ser. No. 17/366,985, filed Jul. 2, 2021, which in turn is a continuation of International Application No. PCT/EP2019/087169, filed Dec. 30, 2019, which is incorporated herein by reference in its entirety, and additionally claims priority from European Application No. EP 19150105.5, filed Jan. 2, 2019, which is incorporated herein by reference in its entirety.

BACKGROUND OF THE INVENTION

Embodiments of the current disclosure relate to the field of encoding and decoding a picture, such as in the field of image or video coding. In particular, embodiments relate to a partitioning tree design and its coding in hybrid video compression, such as in the field of block based image or video coding.

In hybrid video coding, pictures are typically partitioned into smaller variable-sized blocks by which an adaptation to the characteristics of the input video signal can be achieved, which eventually increases the compression efficiency. The partitioning into variable-sized blocks is typically represented by tree structures, such as quadtree, binary tree etc. The associated signaling depends on the chosen tree structure and has an impact on the compression efficiency.

In state-of-the-art hybrid video coding, such as the High-Efficiency Video Coding (HEVC) standard, the input pictures are initially decomposed into disjoint square blocks of a fixed size. Each of these fixed sized square blocks forms the root of a partitioning tree and can be further subdivided into smaller blocks. The blocks that correspond to the leaves of the partitioning tree are used for prediction and transform coding. For these variable-size blocks, the original signal is often predicted; the difference between the original and the prediction signal is referred to as residual signal. The residual signal is transmitted using transform coding. In HEVC, the video pictures are initially partitioned into square blocks, which are referred to as Coding Tree Units (CTUs) and each of the CTUs forms the root of a partitioning tree. HEVC uses quadtree structures for the subdivision into smaller units. At the leaves of the quadtree, the final blocks are referred to as Coding Units (CUs). Each CU forms the root nodes for two further partitioning trees: one for the prediction parameters and another for the transform coding stage. An important property of quadtree structures is that the partitioning syntax element consists of a single bin only. It signals whether or not a current block is split into four equal sized and disjoint blocks; therefore, it is also referred to as a split flag. FIG. 1 illustrates the consequence of a single split to the partitioning tree and the result in the two-dimensional picture. The split syntax element is coded in the regular mode of a context-based adaptive entropy coding engine (HEVC uses Context-Based Adaptive Arithmetic Coding, CABAC). Specifically, an adaptive context model is used for coding this syntax element. The context modeling process for the split syntax element of the quadtree employs data on the quadtree depths of the current node and the already transmitted partitioning trees of neighboring blocks. One out of three available context models is chosen depending on the depths of the neighboring partitioning trees; the following three cases are distinguished: (a) both neighboring depths are greater or equal to the current depth, (b) both neighboring depths are smaller than the current depth, and (c) all other configurations.

In the latest video coding standardization activity of the ITU-T and ISO/IEC, referred to as Versatile Video Coding (VVC), non-square block shapes are used. Two alternative partitioning trees have been incorporated into the existing quadtree design: binary and ternary trees. As their name implies, a node can be split into two or three rectangular shapes. Those split shapes are interchangeable, and form a further split tree themselves, a binary-ternary-tree (BTT).

For example, block-based image/video coding and context modelling for content prediction are used for compression of image or video data.

SUMMARY

An embodiment may have an apparatus for decoding a picture, configured to partition the picture into coding blocks using recursive multi-tree splitting depending on splitting information signaled in a data stream, decode the picture from coding information which is signaled in the data stream and relates to the coding blocks, wherein the apparatus is configured to partition the picture into the coding blocks depending on splitting information signaled in a data stream by decoding a split flag and a quad flag of the splitting information from the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, decoding a split direction flag from the data stream which indicates whether the predetermined block of the picture is to be split vertically or horizontally, if neither a second nor a third predetermined criterion is fulfilled, inferring that the split direction flag indicates that the predetermined block of the picture is to be split vertically, if the second predetermined criterion is fulfilled, and inferring that the split direction flag indicates that the predetermined block of the picture is to be split horizontally, if the third predetermined criterion is fulfilled, decoding a triple flag from the data stream which indicates whether the predetermined block of the picture is to be split into three child blocks or into two child blocks, if a fourth predetermined criterion is not fulfilled, and inferring that the triple flag indicates that the predetermined block of the picture is to be split into two child blocks, if the fourth predetermined criterion is fulfilled, and that the triple flag indicates that the predetermined block of the picture is to be split into three child blocks and suppress the decoding of the triple flag from the data stream, if a fifth predetermined criterion is fulfilled, if the predetermined block of the picture is to be split, resuming the recursive multi-tree splitting for the child blocks using even further flags of the splitting information, decode the split direction flag from the data stream by context adaptive entropy decoding using a second context which depends on whether, and discriminates between, a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical, the first number being greater than the second number, and the first number being smaller than the second number.

Another embodiment may have an apparatus for decoding a picture, configured to partition the picture into coding blocks using recursive multi-tree splitting depending on splitting information signaled in a data stream, decode the picture from coding information which is signaled in the data stream and relates to the coding blocks, wherein the apparatus is configured to partition the picture into the coding blocks depending on splitting information signaled in a data stream by decoding a split flag and a quad flag of the splitting information from the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, decoding a split direction flag from the data stream which indicates whether the predetermined block of the picture is to be split vertically or horizontally, if neither a second nor a third predetermined criterion is fulfilled, inferring that the split direction flag indicates that the predetermined block of the picture is to be split vertically, if the second predetermined criterion is fulfilled, and inferring that the split direction flag indicates that the predetermined block of the picture is to be split horizontally, if the third predetermined criterion is fulfilled, decoding a triple flag from the data stream which indicates whether the predetermined block of the picture is to be split into three child blocks or into two child blocks, if a fourth predetermined criterion is not fulfilled, and inferring that the triple flag indicates that the predetermined block of the picture is to be split into two child blocks, if the fourth predetermined criterion is fulfilled, if the predetermined block of the picture is to be split, resuming the recursive multi-tree splitting for the child blocks using even further flags of the splitting information, decode the split direction flag from the data stream by context adaptive entropy decoding using a second context which depends on whether, and discriminates between, the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical, the fourth predetermined criterion would be fulfilled in case of the split direction indicated by the split direction flag being horizontal and not be fulfilled in case of the split direction indicated by the split direction flag being vertical, and the fourth predetermined criterion would not be fulfilled in case of the split direction indicated by the split direction flag being horizontal and be fulfilled in case of the split direction indicated by the split direction flag being vertical.

Yet another embodiment may have an apparatus for encoding a picture, configured to partition the picture into coding blocks using recursive multi-tree splitting and encode splitting information defining the partitioning in a data stream, encode the picture into coding information which is signaled in the data stream and relates to the coding blocks and encode the coding information in the data stream, wherein the apparatus is configured to partition the picture into the coding blocks depending on splitting information signaled in a data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, encoding a split direction flag into the data stream which indicates whether the predetermined block of the picture is to be split vertically or horizontally, if neither a second nor a third predetermined criterion is fulfilled, suppress the encoding of the split direction flag if the second predetermined criterion is fulfilled wherein same is to be inferred to indicate that predetermined block of the picture is to be split vertically, if the second predetermined criterion is fulfilled, and suppress the encoding of the split direction flag if the third predetermined criterion is fulfilled wherein same is to be inferred to indicate that the predetermined block of the picture is to be split horizontally, if the third predetermined criterion is fulfilled, encoding a triple flag into the data stream which indicates whether the predetermined block of the picture is to be split into three child blocks or into two child blocks, if fourth and fifth predetermined criteria are not fulfilled, and suppress the encoding the triple flag if the fourth predetermined criterion is fulfilled wherein same is to be inferred to indicate that the predetermined block of the picture is to be split into two child blocks, if the fourth predetermined criterion is fulfilled, and suppress the encoding the triple flag if the fifth predetermined criterion is fulfilled, wherein the triple flag is to be inferred to indicate that the predetermined block of the picture is to be split into three child blocks, if the fifth predetermined criterion is fulfilled, if the predetermined block of the picture is to be split,
resuming the encoding the splitting information for the child blocks using even further flags of the splitting information, encode the split direction flag into the data stream by context adaptive entropy encoding using a second context which depends on whether, and discriminates between, a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical, the first number being greater than the second number, and the first number being smaller than the second number.

Yet another embodiment may have an apparatus for encoding a picture, configured to partition the picture into coding blocks using recursive multi-tree splitting and encode splitting information defining the partitioning in a data stream, encode the picture into coding information which relates to the coding blocks and encode the coding information in the data stream, wherein the apparatus is configured to encode the splitting information in the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, encoding a split direction flag into the data stream which indicates whether the predetermined block of the picture is to be split vertically or horizontally, if neither a second nor a third predetermined criterion is fulfilled, suppress the encoding of the split direction flag if the second predetermined criterion is fulfilled wherein same is to be inferred to indicate that predetermined block of the picture is to be split vertically, if the second predetermined criterion is fulfilled, and suppress the encoding of the split direction flag if the third predetermined criterion is fulfilled wherein same is to be inferred to indicate that the predetermined block of the picture is to be split horizontally, if the third predetermined criterion is fulfilled, encoding a triple flag into the data stream which indicates whether the predetermined block of the picture is to be split into three child blocks or into two child blocks, if a fourth predetermined criterion is not fulfilled, and suppress the encoding the triple flag if the fourth predetermined criterion is fulfilled wherein same is to be inferred to indicate that the predetermined block of the picture is to be split into two child blocks, if the fourth predetermined criterion is fulfilled, if the predetermined block of the picture is to be split,
resuming the encoding of the splitting information for the child blocks using even further flags of the splitting information, encode the split direction flag into the data stream by context adaptive entropy encoding using a second context which depends on whether, and discriminates between, the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical, the fourth predetermined criterion would be fulfilled in case of the split direction indicated by the split direction flag being horizontal and not be fulfilled in case of the split direction indicated by the split direction flag being vertical, and the fourth predetermined criterion would not be fulfilled in case of the split direction indicated by the split direction flag being horizontal and be fulfilled in case of the split direction indicated by the split direction flag being vertical.

According to an embodiment, a method for decoding a picture may have the steps of:

partitioning the picture into coding blocks using recursive multi-tree splitting depending on splitting information signaled in a data stream, decoding the picture from coding information which is signaled in the data stream and relates to the coding blocks, wherein the method includes partitioning the picture into the coding blocks depending on splitting information signaled in a data stream by decoding a split flag and a quad flag of the splitting information from the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks,
  decoding a split direction flag from the data stream which indicates whether the predetermined block of the picture is to be split vertically or horizontally, if neither a second nor a third predetermined criterion is fulfilled,
  inferring that the split direction flag indicates that the predetermined block of the picture is to be split vertically, if the second predetermined criterion is fulfilled, and
  inferring that the split direction flag indicates that the predetermined block of the picture is to be split horizontally, if the third predetermined criterion is fulfilled,
  decoding a triple flag from the data stream which indicates whether the predetermined block of the picture is to be split into three child blocks or into two child blocks, if a fourth predetermined criterion is not fulfilled, and
  inferring that the triple flag indicates that the predetermined block of the picture is to be split into two child blocks, if the fourth predetermined criterion is fulfilled, and that the triple flag indicates that the predetermined block of the picture is to be split into three child blocks and suppress the decoding of the triple flag from the data stream, if a fifth predetermined criterion is fulfilled,
if the predetermined block of the picture is to be split, resuming the recursive multi-tree splitting for the child blocks using even further flags of the splitting information,
decoding the split direction flag from the data stream by context adaptive entropy decoding using a second context which depends on whether, and discriminates between,
  a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical,
  the first number being greater than the second number, and
  the first number being smaller than the second number.

According to another embodiment, a method for decoding a picture may have the steps of:
  partitioning the picture into coding blocks using recursive multi-tree splitting depending on splitting information signaled in a data stream,
  decoding the picture from coding information which is signaled in the data stream and relates to the coding blocks,
  wherein the method includes partitioning the picture into the coding blocks depending on splitting information signaled in a data stream by
    decoding a split flag and a quad flag of the splitting information from the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not,
    if the predetermined block of the picture is to be split, but not to be split into four child blocks,
      decoding a split direction flag from the data stream which indicates whether the predetermined block of the picture is to be split vertically or horizontally, if neither a second nor a third predetermined criterion is fulfilled,
      inferring that the split direction flag indicates that the predetermined block of the picture is to be split vertically, if the second predetermined criterion is fulfilled, and
      inferring that the split direction flag indicates that the predetermined block of the picture is to be split horizontally, if the third predetermined criterion is fulfilled,
      decoding a triple flag from the data stream which indicates whether the predetermined block of the picture is to be split into three child blocks or into two child blocks, if a fourth predetermined criterion is not fulfilled, and
      inferring that the triple flag indicates that the predetermined block of the picture is to be split into two child blocks, if the fourth predetermined criterion is fulfilled,
    if the predetermined block of the picture is to be split, resuming the recursive multi-tree splitting for the child blocks using even further flags of the splitting information,
  decoding the split direction flag from the data stream by context adaptive entropy decoding using a second context which depends on whether, and discriminates between,
    the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical,
    the fourth predetermined criterion would be fulfilled in case of the split direction indicated by the split direction flag being horizontal and not be fulfilled in case of the split direction indicated by the split direction flag being vertical, and
    the fourth predetermined criterion would not be fulfilled in case of the split direction indicated by the split direction flag being horizontal and be fulfilled in case of the split direction indicated by the split direction flag being vertical.

According to yet another embodiment, a method for encoding a picture may have the steps of:
  partitioning the picture into coding blocks using recursive multi-tree splitting and encoding splitting information defining the partitioning in a data stream,
  encoding the picture into coding information which is signaled in the data stream and relates to the coding blocks and encode the coding information in the data stream,
  wherein the method includes partitioning the picture into the coding blocks depending on splitting information signaled in a data stream by
    encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, encoding a split direction flag into the data stream which indicates whether the predetermined block of the picture is to be split vertically or horizontally, if neither a second nor a third predetermined criterion is fulfilled, suppressing the encoding of the split direction flag if the second predetermined criterion is fulfilled wherein same is to be inferred to indicate that predetermined block of the picture is to be split vertically, if the second predetermined criterion is fulfilled, and suppressing the encoding of the split direction flag if the third predetermined criterion is fulfilled wherein same is to be inferred to indicate that the predetermined block of the picture is to be split horizontally, if the third predetermined criterion is fulfilled, encoding a triple flag into the data stream which indicates whether the predetermined block of the picture is to be split into three child blocks or into two child blocks, if fourth and fifth predetermined criteria are not fulfilled, and suppressing the encoding the triple flag if the fourth predetermined criterion is fulfilled wherein same is to be inferred to indicate that the predetermined block of the picture is to be split into two child blocks, if the fourth predetermined criterion is fulfilled, and suppressing the encoding the triple flag if the fifth predetermined criterion is fulfilled, wherein the triple flag is to be inferred to indicate that the predetermined block of the picture is to be split into three child blocks, if the fifth predetermined criterion is fulfilled, if the predetermined block of the picture is to be split, resuming the encoding the splitting information for the child blocks using even further flags of the splitting information, encoding the split direction flag into the data stream by context adaptive entropy encoding using a second context which depends on whether, and discriminates between, a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical, the first number being greater than the second number, and the first number being smaller than the second number.

According to still another embodiment, a method for encoding a picture may have the steps of:

partitioning the picture into coding blocks using recursive multi-tree splitting and encoding splitting information defining the partitioning in a data stream, encoding the picture into coding information which relates to the coding blocks and encode the coding information in the data stream, wherein the method includes encoding the splitting information in the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not, if the predetermined block of the picture is to be split, but not to be split into four child blocks, encoding a split direction flag into the data stream which indicates whether the predetermined block of the picture is to be split vertically or horizontally, if neither a second nor a third predetermined criterion is fulfilled, suppress the encoding of the split direction flag if the second predetermined criterion is fulfilled wherein same is to be inferred to indicate that predetermined block of the picture is to be split vertically, if the second predetermined criterion is fulfilled, and suppressing the encoding of the split direction flag if the third predetermined criterion is fulfilled wherein same is to be inferred to indicate that the predetermined block of the picture is to be split horizontally, if the third predetermined criterion is fulfilled, encoding a triple flag into the data stream which indicates whether the predetermined block of the picture is to be split into three child blocks or into two child blocks, if a fourth predetermined criterion is not fulfilled, and suppressing the encoding the triple flag if the fourth predetermined criterion is fulfilled wherein same is to be inferred to indicate that the predetermined block of the picture is to be split into two child blocks, if the fourth predetermined criterion is fulfilled, if the predetermined block of the picture is to be split, resuming the encoding of the splitting information for the child blocks using even further flags of the splitting information, encoding the split direction flag into the data stream by context adaptive entropy encoding using a second context which depends on whether, and discriminates between, the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical, the fourth predetermined criterion would be fulfilled in case of the split direction indicated by the split direction flag being horizontal and not be fulfilled in case of the split direction indicated by the split direction flag being vertical, and the fourth predetermined criterion would not be fulfilled in case of the split direction indicated by the split direction flag being horizontal and be fulfilled in case of the split direction indicated by the split direction flag being vertical.

Another embodiment may have a data stream encoded by any of the inventive method for encoding.

According to another embodiment, a non-transitory digital storage medium may have a computer program stored thereon to perform any of the inventive methods when said computer program is run by a computer.

An aspect of the present disclosure concerns an apparatus for decoding a picture. The apparatus is configured to partition the picture into coding blocks, for example tree leaf blocks, using recursive multi-tree splitting depending on splitting information signaled in a data stream. The apparatus is further configured to decode the picture from coding information which is signaled in the data stream and relates to the coding blocks. The apparatus is configured to partition the picture into the coding blocks depending on splitting information signaled in a data stream, e.g. the data stream, by decoding a split flag of the splitting information from the data stream which indicates whether a predetermined block of the picture is to be split or not to be split thereby stopping the recursive multi-tree splitting with the predetermined block becoming one of the coding blocks. That is, for example, if the split flag indicates that the predetermined block is not to be split, the recursive multi-tree splitting is stopped. If the split flag indicates that the predetermined block of the picture is to be split, the partitioning of the picture comprises decoding a quad flag of the splitting information from the data stream which indicates whether the predetermined block of the picture is to be split into four child blocks or not. If the split flag indicates that the predetermined block of the picture is to be split, and if the quad flag indicates that the predetermined block of the picture is not to be split into four child blocks, the partitioning of the picture comprises decoding one or more further flags of the splitting information from the data stream which indicate whether the predetermined block of the picture is to be split into two or three child blocks vertically or horizontally. Further, if the split flag indicates that the predetermined block of the picture is to be split, the partitioning of the picture comprises resuming the recursive multi-tree splitting for the child blocks using even further flags of the splitting information. For example, in a further recursion of the recursive multi-tree splitting, one of the child blocks may be the predetermined block. As the apparatus may stop the partitioning, if the split flag indicates that the predetermined block of the picture is to be split, and as the apparatus may decode and/or evaluate the split flag before decoding a further flag, such as the quad flag, the apparatus may only decode one flag, namely the split flag, if the predetermined block is not to be split further. Stopping the recursive partitioning after decoding of only one flag increases the decoding efficiency. Further, if the predetermined block is not to be split further, it may be sufficient to have the split flag in the splitting information, thus decreasing the size of the data stream.

Another aspect concerns an apparatus for decoding a picture. The apparatus is configured to partition the picture into coding blocks using recursive multi-tree splitting depending on splitting information signaled in a data stream. The apparatus is further configured to decode the picture from coding information which is signaled in the data stream and relates to the coding blocks. The apparatus is configured to partition the picture into the coding blocks depending on splitting information signaled in a data stream, e.g. the data stream, by decoding a split flag and a quad flag of the splitting information from the data stream. The split flag indicates whether a predetermined block of the picture is to be split or not to be split thereby stopping the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks, the partitioning of the picture comprises obtaining an information about a split direction flag and an information about a triple flag. The apparatus is configured to obtain the information about a split direction flag by decoding a split direction flag from the data stream which indicates whether the predetermined block of the picture is to be split vertically or horizontally, if neither a second nor a third predetermined criterion is fulfilled. If the second predetermined criterion is fulfilled, the apparatus is configured to obtain the information about a split direction flag by inferring that the split direction flag indicates that the predetermined block of the picture is to be split vertically. If the third predetermined criterion is fulfilled, the apparatus is configured to obtain the information about a split direction flag by inferring that the split direction flag indicates that the predetermined block of the picture is to be split horizontally. The apparatus is configured to obtain the information about a split direction flag by decoding a triple flag from the data stream if a fourth predetermined criterion is not fulfilled. The triple flag indicates whether the predetermined block of the picture is to be split into three child blocks or into two child blocks. If the fourth predetermined criterion is fulfilled, the apparatus is configured to obtain the information about a split direction flag by inferring that the triple flag indicates that the predetermined block of the picture is to be split into two child blocks. Further, if the predetermined block of the picture is to be split, the partitioning of the picture comprises resuming the recursive multi-tree splitting for the child blocks using even further flags of the splitting information. The apparatus is further configured to decode the split direction flag from the data stream by context adaptive entropy decoding using a second context. The second context depends on whether, and discriminates between a fulfillment of the following scenarios. In a first scenario, the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical. In a second scenario, the fourth predetermined criterion would be fulfilled in case of the split direction indicated by the split direction flag being horizontal and not be fulfilled in case of the split direction indicated by the split direction flag being vertical. In a third scenario, the fourth predetermined criterion would not be fulfilled in case of the split direction indicated by the split direction flag being horizontal and be fulfilled in case of the split direction indicated by the split direction flag being vertical.

Another aspect concerns an apparatus for decoding a picture, configured to partition the picture into coding blocks using recursive multi-tree splitting depending on splitting information signaled in a data stream. The apparatus is further configured to decode the picture from coding information which is signaled in the data stream and relates to the coding blocks. The apparatus is configured to partition the picture into the coding blocks depending on splitting information signaled in a data stream by decoding a split flag and a quad flag of the splitting information from the data stream. The split flag indicates whether a predetermined block of the picture is to be split or not to be split, the latter implying a stopping of the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks the apparatus is configured for obtaining an information about a split direction flag and an information about a triple flag. Obtaining the information about a split direction flag comprises decoding a split direction flag from the data stream which indicates whether the predetermined block of the picture is to be split vertically or horizontally, if neither a second nor a third predetermined criterion is fulfilled. If the second predetermined criterion is fulfilled, obtaining the information about a split direction flag comprises inferring that the split direction flag indicates that the predetermined block of the picture is to be split vertically.

If the third predetermined criterion is fulfilled, obtaining the information about a split direction flag comprises inferring that the split direction flag indicates that the predetermined block of the picture is to be split horizontally. Obtaining the information about a triple flag comprises decoding a triple flag from the data stream which indicates whether the predetermined block of the picture is to be split into three child blocks or into two child blocks, if a fourth predetermined criterion is not fulfilled. If the fourth predetermined criterion is fulfilled, obtaining the information about a triple flag comprises inferring that the triple flag indicates that the predetermined block of the picture is to be split into two child blocks. Further, if a fifth predetermined criterion is fulfilled, obtaining the information about a triple flag comprises inferring that the triple flag indicates that the predetermined block of the picture is to be split into three child blocks and suppressing the decoding of the triple flag from the data stream. If the predetermined block of the picture is to be split, the partitioning of the picture comprises resuming the recursive multi-tree splitting for the child blocks using even further flags of the splitting information. Further, the apparatus if configured to decode the split direction flag from the data stream by context adaptive entropy decoding using a second context. The second context depends on whether, and discriminates between, a first number of criteria among the fourth and fifth predetermined criteria being equal, greater and smaller than a second number of criteria among the fourth and fifth predetermined criteria. The first number of criteria among the fourth and fifth predetermined criteria would be fulfilled in case of a split direction indicated by the split direction flag being horizontal. The second number of criteria among the fourth and fifth predetermined criteria would be fulfilled in case of the split direction indicated by the split direction flag being vertical.

Another aspect concerns an apparatus for decoding a picture, configured to partition the picture into coding blocks using recursive multi-tree splitting depending on splitting information signaled in a data stream. The apparatus is further configured to decode the picture from coding information which is signaled in the data stream and relates to the coding blocks. The apparatus is configured to partition the picture into the coding blocks depending on splitting information signaled in a data stream, e.g. the data stream, by decoding a split flag and a quad flag of the splitting information from the data stream. The split flag indicates whether a predetermined block of the picture is to be split or not to be split thereby stopping the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks, the partitioning of the picture comprises decoding a split direction flag from the data stream and decoding a triple flag from the data stream. The split direction flag indicates whether the predetermined block of the picture is to be split vertically or horizontally. The triple flag indicates whether the predetermined block of the picture is to be split into three child blocks or into two child blocks. If the predetermined block of the picture is to be split, the partitioning of the picture comprises resuming the recursive multi-tree splitting for the child blocks using even further flags of the splitting information. The apparatus is further configured to decode the triple flag from the data stream by context adaptive entropy decoding using a third context. The third context depends on a number of splits of the recursive multi-tree splitting, e.g. a number of recursions of the recursive multi-tree splitting, using which the predetermined block is obtained, or the third context depends on a size of the predetermined block. Alternatively or additionally, the third context depends on whether, and discriminates between the split direction flag indicating a horizontal split direction, and the split direction flag indicating a vertical split direction.

Another aspect concerns an apparatus for decoding a picture, configured to partition the picture into coding blocks using recursive multi-tree splitting depending on splitting information signaled in a data stream. The apparatus if further configured to decode the picture from coding information which is signaled in the data stream and relates to the coding blocks. The apparatus is configured to partition the picture into the coding blocks depending on splitting information signaled in a data stream, e.g. the data stream, by decoding a split flag and a quad flag of the splitting information from the data stream. The split flag indicates whether a predetermined block of the picture is to be split or not to be split thereby stopping the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks, partitioning the picture comprises decoding one or more further flags of the splitting information from the data stream which indicate whether the predetermined block of the picture is to be split into two or three child blocks vertically or horizontally. If the predetermined block of the picture is to be split, partitioning the picture comprises resuming the recursive multi-tree splitting for the child blocks using even further flags of the splitting information. The apparatus is further configured to select one of a first mode and a second mode. In the first mode, the apparatus is configured to decode the quad flag after the split flag if the split flag indicates that the predetermined block of the picture is to be split. In the second mode, the apparatus if configured to decode the split flag after the quad flag if the quad flag indicates that the predetermined child block of the picture is not to be split into four child blocks.

Another aspect concerns an apparatus for encoding a picture. The apparatus is configured to partition the picture into coding blocks using recursive multi-tree splitting. The apparatus is configured to encode splitting information in a data stream, the splitting information defining the partitioning of the picture. The apparatus is further configured to encode the picture into coding information which relates to the coding blocks and to encode the coding information in the data stream. The apparatus is configured to encode the splitting information in the data stream by encoding a split flag of the splitting information into the data stream. The split flag indicates whether a predetermined block of the picture is to be split or not to be split thereby stopping the recursive multi-tree splitting with the predetermined block becoming one of the coding blocks. For example, the split flag may indicate to a decoder decoding the split flag, if the predetermined block is a coding block, e.g. a tree leaf block, or if the predetermined block is further split by another recursion of the recursive multi-tree splitting, thereby instructing the decoder to perform another such recursion. If the split flag indicates that the predetermined block of the picture is to be split, the encoding of the splitting information comprises encoding a quad flag of the splitting information into the data stream. The quad flag indicates whether the predetermined block of the picture is to be split into four child blocks or not. If the split flag indicates that the predetermined block of the picture is to be split, and if the quad flag indicates that the predetermined block of the picture is not to be split into four child blocks, the encoding of the splitting information further comprises encoding one or more further flags of the splitting information into the data stream. The one or more further flags indicate whether the predetermined block of the picture is to be split into two or three child blocks vertically or horizontally. If the split flag indicates that the predetermined block of the picture is to be split, the encoding of the splitting information further comprises resuming the encoding of the splitting information for the child blocks using even further flags of the splitting information. For example, in a further recursion of the recursive multi-tree splitting, one of the child blocks may be the predetermined block.

Another aspect concerns an apparatus for encoding a picture, configured to partition the picture into coding blocks using recursive multi-tree splitting and to encode splitting information defining the partitioning in a data stream. The apparatus is further configured to encode the picture into coding information which relates to the coding blocks and encode the coding information in the data stream. The apparatus is configured to encode the splitting information in the data stream by encoding a split flag and a quad flag of the splitting information into the data stream. The split flag indicates whether a predetermined block of the picture is to be split or not to be split thereby stopping the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks, and if neither a second nor a third predetermined criterion is fulfilled, the encoding of the splitting information comprises encoding a split direction flag into the data stream. The split direction flag indicates whether the predetermined block of the picture is to be split vertically or horizontally. If the predetermined block of the picture is to be split, but not to be split into four child blocks, and if the second predetermined criterion is fulfilled, the encoding of the splitting information comprises suppressing the encoding of the split direction flag, wherein the split direction flag is to be inferred to indicate that the predetermined block of the picture is to be split vertically, if the second predetermined criterion is fulfilled. If the predetermined block of the picture is to be split, but not to be split into four child blocks, and if the third predetermined criterion is fulfilled, the encoding of the splitting information comprises suppressing the encoding of the split direction flag, wherein same is to be inferred to indicate that the predetermined block of the picture is to be split horizontally, if the third predetermined criterion is fulfilled. If the predetermined block of the picture is to be split, but not to be split into four child blocks, and if a fourth predetermined criterion is not fulfilled, the encoding of the splitting information comprises encoding a triple flag into the data stream. The triple flag indicates whether the predetermined block of the picture is to be split into three child blocks or into two child blocks. If the predetermined block of the picture is to be split, but not to be split into four child blocks, and if the fourth predetermined criterion is fulfilled, the encoding of the splitting information comprises suppressing the encoding of the triple flag, wherein same is to be inferred to indicate that the predetermined block of the picture is to be split into two child blocks, if the fourth predetermined criterion is fulfilled. If the predetermined block of the picture is to be split, the encoding of the splitting information comprises resuming the encoding of the splitting information for the child blocks using even further flags of the splitting information. The apparatus is further configured to encode the split direction flag into the data stream by context adaptive entropy encoding using a second context. The second context depends on whether, and discriminates between a fulfillment of the following scenarios. In a first scenario, the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical. In a second scenario, the fourth predetermined criterion would be fulfilled in case of the split direction indicated by the split direction flag being horizontal and not be fulfilled in case of the split direction indicated by the split direction flag being vertical. In a third scenario, the fourth predetermined criterion would not be fulfilled in case of the split direction indicated by the split direction flag being horizontal and be fulfilled in case of the split direction indicated by the split direction flag being vertical.

Another aspect concerns an apparatus for encoding a picture, configured to partition the picture into coding blocks using recursive multi-tree splitting and encode splitting information defining the partitioning in a data stream. The apparatus is further configured to encode the picture into coding information which is signaled in the data stream and relates to the coding blocks and encode the coding information in the data stream. The apparatus is configured to partition the picture into the coding blocks depending on splitting information signaled in a data stream by encoding a split flag and a quad flag of the splitting information into the data stream. The split flag indicates whether a predetermined block of the picture is to be split or not to be split thereby stopping the recursive multi-tree splitting with the predetermined block becoming one of the coding blocks. The quad flag indicates whether the predetermined block of the picture is to be split into four child blocks or not. If the predetermined block of the picture is to be split, but not to be split into four child blocks, and if neither a second nor a third predetermined criterion is fulfilled, the partitioning of the picture comprises encoding a split direction flag into the data stream. The split direction flag indicates whether the predetermined block of the picture is to be split vertically or horizontally. If the predetermined block of the picture is to be split, but not to be split into four child blocks, and if neither a second nor a third predetermined criterion is fulfilled, the partitioning of the picture comprises suppressing the encoding of the split direction flag wherein same is to be inferred to indicate that predetermined block of the picture is to be split vertically, if the second predetermined criterion is fulfilled. If the predetermined block of the picture is to be split, but not to be split into four child blocks, and if the third predetermined criterion is fulfilled, the partitioning of the picture comprises suppressing the encoding of the split direction flag, wherein same is to be inferred to indicate that the predetermined block of the picture is to be split horizontally, if the third predetermined criterion is fulfilled. If the predetermined block of the picture is to be split, but not to be split into four child blocks, and if fourth and fifth predetermined criteria are not fulfilled, the partitioning of the picture comprises encoding a triple flag into the data stream. The triple flag indicates whether the predetermined block of the picture is to be split into three child blocks or into two child blocks. If the predetermined block of the picture is to be split, but not to be split into four child blocks, and if the fourth predetermined criterion is fulfilled, the partitioning of the picture comprises suppressing the encoding the triple flag, wherein same is to be inferred to indicate that the predetermined block of the picture is to be split into two child blocks, if the fourth predetermined criterion is fulfilled. If the predetermined block of the picture is to be split, but not to be split into four child blocks, and if the fifth predetermined criterion is fulfilled, the partitioning of the picture comprises suppressing the encoding of the triple flag, wherein the triple flag is to be inferred to indicate that the predetermined block of the picture is to be split into three child blocks, if the fifth predetermined criterion is fulfilled. If the predetermined block of the picture is to be split, the partitioning of the picture comprises resuming the encoding the splitting information for the child blocks using even further flags of the splitting information. Further, the apparatus is configured to encode the split direction flag into the data stream by context adaptive entropy encoding using a second context which depends on whether, and discriminates between a first number being equal, greater or smaller than a second number. The first number is a first number of criteria among the fourth and fifth predetermined criteria which would be fulfilled in case of a split direction indicated by the split direction flag being horizontal. The second number is a second number of criteria among the fourth and fifth predetermined criteria which would be fulfilled in case of the split direction indicated by the split direction flag being vertical.

Another aspect concerns an apparatus for encoding a picture, configured to partition the picture into coding blocks using recursive multi-tree splitting and encode splitting information defining the partitioning in a data stream. Further, the apparatus is configured to encode the picture into coding information which relates to the coding blocks and encode the coding information in the data stream. The apparatus is configured to encode the splitting information into the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, the encoding of the splitting information comprises encoding a split direction flag into the data stream and encoding a triple flag into the data stream. The split direction flag indicates whether the predetermined block of the picture is to be split vertically or horizontally. The triple flag indicates whether the predetermined block of the picture is to be split into three child blocks or into two child blocks. If the predetermined block of the picture is to be split, the encoding of the splitting information comprises resuming the encoding of the splitting information for the child blocks using even further flags of the splitting information. The apparatus is configured to encode the triple flag into the data stream by context adaptive entropy encoding using a third context. The third context depends on a number of splits of the recursive multi-tree splitting using which the predetermined block is obtained, or the third context depends on a size of the predetermined block. Additionally or alternatively, the third context depends on whether, and discriminates between, the split direction flag indicating a horizontal split direction, and the split direction flag indicating a vertical split direction.

Another aspect concerns an apparatus for encoding a picture, configured to partition the picture into coding blocks using recursive multi-tree splitting and encode splitting information defining the partitioning in a data stream. The apparatus is further configured to encode the picture into coding information which relates to the coding blocks and encode the coding information in the data stream. The apparatus is configured to encode the splitting information into the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, the encoding of the splitting information comprises encoding one or more further flags of the splitting information into the data stream which indicate whether the predetermined block of the picture is to be split into two or three child blocks vertically or horizontally. If the predetermined block of the picture is to be split, the encoding of the splitting information comprises resuming the encoding of the splitting information for the child blocks using even further flags of the splitting information. The apparatus is configured to select one of a first mode and a second mode. In the first mode, the apparatus is configured to encode the quad flag after the split flag if the split flag indicates that the predetermined block of the picture is to be split. In the second mode, the apparatus is configured to encode the split flag after the quad flag if the quad flag indicates that the predetermined child block of the picture is not to be split into four child blocks.

Another aspect concerns a method for decoding a picture, comprising a partitioning of the picture 12' into coding blocks using recursive multi-tree splitting depending on splitting information signaled in a data stream, and further comprising a decoding the picture 12' from coding information which is signaled in the data stream and relates to the coding blocks. The method further comprises partitioning the picture 12' into the coding blocks depending on splitting information signaled in a data stream by decoding a split flag of the splitting information from the data stream which indicates whether a predetermined block of the picture 12' is to be split or not to be split thereby stopping the recursive multi-tree splitting with the predetermined block becoming one of the coding blocks. If the split flag indicates that the predetermined block of the picture 12' is to be split, the partitioning of the picture comprises decoding a quad flag of the splitting information from the data stream which indicates whether the predetermined block of the picture 12' is to be split into four child blocks or not. If the quad flag indicates that the predetermined block of the picture 12' is not to be split into four child blocks, the partitioning of the picture comprises decoding one or more further flags of the splitting information from the data stream which indicate whether the predetermined block of the picture 12' is to be split into two or three child blocks vertically or horizontally. If the split flag indicates that the predetermined block of the picture 12' is to be split, the partitioning of the picture comprises resuming the recursive multi-tree splitting for the child blocks using even further flags of the splitting information.

Another aspect concerns a method for decoding a picture, comprising a partitioning of the picture 12' into coding blocks using recursive multi-tree splitting depending on splitting information signaled in a data stream. The method further comprises decoding the picture 12' from coding information which is signaled in the data stream and relates to the coding blocks. The method comprises partitioning the picture 12' into the coding blocks depending on splitting information signaled in a data stream by decoding a split flag and a quad flag of the splitting information from the data stream, wherein the split flag indicates whether a predetermined block of the picture 12' is to be split or not to be split thereby stopping the recursive multi-tree splitting with the predetermined block becoming one of the coding blocks, and the quad flag indicates whether the predetermined block of the picture 12' is to be split into four child blocks or not. If the predetermined block of the picture 12' is to be split, but not to be split into four child blocks, the partitioning of the picture comprises decoding a split direction flag from the data stream which indicates whether the predetermined block of the picture 12' is to be split vertically or horizontally, if neither a second nor a third predetermined criterion is fulfilled. If the predetermined block of the picture 12' is to be split, but not to be split into four child blocks, the partitioning of the picture comprises inferring that the split direction flag indicates that the predetermined block of the picture 12' is to be split vertically, if the second predetermined criterion is fulfilled. If the predetermined block of the picture 12' is to be split, but not to be split into four child blocks, the partitioning of the picture comprises inferring that the split direction flag indicates that the predetermined block of the picture 12' is to be split horizontally, if the third predetermined criterion is fulfilled. If the predetermined block of the picture 12' is to be split, but not to be split into four child blocks, the partitioning of the picture comprises decoding a triple flag from the data stream which indicates whether the predetermined block of the picture 12' is to be split into three child blocks or into two child blocks, if a fourth predetermined criterion is not fulfilled. If the predetermined block of the picture 12' is to be split, but not to be split into four child blocks, the partitioning of the picture comprises inferring that the triple flag indicates that the predetermined block of the picture 12' is to be split into two child blocks, if the fourth predetermined criterion is fulfilled. If the predetermined block of the picture 12' is to be split, the partitioning of the picture comprises resuming the recursive multi-tree splitting for the child blocks using even further flags of the splitting information. The method further comprises decoding the split direction flag from the data stream by context adaptive entropy decoding using a second context which depends on whether, and discriminates between, a and which of the following scenarios being fulfilled: (i) the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical, (ii) the fourth predetermined criterion would be fulfilled in case of the split direction indicated by the split direction flag being horizontal and not be fulfilled in case of the split direction indicated by the split direction flag being vertical, and (iii) the fourth predetermined criterion would not be fulfilled in case of the split direction indicated by the split direction flag being horizontal and be fulfilled in case of the split direction indicated by the split direction flag being vertical.

Another aspect concerns a method for decoding a picture, comprising a partitioning of the picture 12' into coding blocks using recursive multi-tree splitting depending on splitting information signaled in a data stream, and further comprising decoding the picture 12' from coding information which is signaled in the data stream and relates to the coding blocks. The method comprises partitioning the picture 12' into the coding blocks depending on splitting information signaled in a data stream by decoding a split flag and a quad flag of the splitting information from the data stream, wherein the split flag indicates whether a predetermined block of the picture 12' is to be split or not to be split thereby stopping the recursive multi-tree splitting with the predetermined block becoming one of the coding blocks, and the quad flag indicates whether the predetermined block of the picture 12' is to be split into four child blocks or not. If the predetermined block of the picture 12' is to be split, but not to be split into four child blocks, the partitioning of the picture comprises decoding a split direction flag from the data stream which indicates whether the predetermined block of the picture 12' is to be split vertically or horizontally, if neither a second nor a third predetermined criterion is fulfilled. If the predetermined block of the picture 12' is to be split, but not to be split into four child blocks, the partitioning of the picture further comprises inferring that the split direction flag indicates that the predetermined block of the picture 12' is to be split vertically, if the second predetermined criterion is fulfilled. If the predetermined block of the picture 12' is to be split, but not to be split into four child blocks, the partitioning of the picture further comprises inferring that the split direction flag indicates that the predetermined block of the picture 12' is to be split horizontally, if the third predetermined criterion is fulfilled. If the predetermined block of the picture 12' is to be split, but not to be split into four child blocks, the partitioning of the picture further comprises decoding a triple flag from the data stream which indicates whether the predetermined block of the picture 12' is to be split into three child blocks or into two child blocks, if a fourth predetermined criterion is not fulfilled. If the predetermined block of the picture 12' is to be split, but not to be split into four child blocks, the partitioning of the picture further comprises inferring that the triple flag indicates that the predetermined block of the picture 12' is to be split into two child blocks, if the fourth predetermined criterion is fulfilled, and that the triple flag indicates that the predetermined block of the picture 12' is to be split into three child blocks and suppress the decoding of the triple flag from the data stream, if a fifth predetermined criterion is fulfilled. If the predetermined block of the picture 12' is to be split, the partitioning of the picture comprises resuming the recursive multi-tree splitting for the child blocks using even further flags of the splitting information. Further, the method comprises decoding the split direction flag from the data stream by context adaptive entropy decoding using a second context which depends on whether, and discriminates between (i) a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical (ii) the first number being greater than the second number, and (iii) the first number being smaller than the second number.

Another aspect concerns a method for decoding a picture, comprising a partitioning of the picture 12' into coding blocks using recursive multi-tree splitting depending on splitting information signaled in a data stream, and further comprising decoding the picture 12' from coding information which is signaled in the data stream and relates to the coding blocks. The method comprises partitioning the picture 12' into the coding blocks depending on splitting information signaled in a data stream by decoding a split flag and a quad flag of the splitting information from the data stream, wherein the split flag indicates whether a predetermined block of the picture 12' is to be split or not to be split thereby stopping the recursive multi-tree splitting with the predetermined block becoming one of the coding blocks, and the quad flag indicates whether the predetermined block of the picture 12' is to be split into four child blocks or not. If the predetermined block of the picture 12' is to be split, but not to be split into four child blocks, the partitioning of the picture comprises decoding a split direction flag from the data stream which indicates whether the predetermined block of the picture 12' is to be split vertically or horizontally, and decoding a triple flag from the data stream which indicates whether the predetermined block of the picture 12' is to be split into three child blocks or into two child blocks. If the predetermined block of the picture 12' is to be split, the partitioning of the picture comprises resuming the recursive multi-tree splitting for the child blocks using even further flags of the splitting information. The decoding of the triple flag from the data stream by context adaptive entropy decoding comprises using a third context which depends on a number of splits of the recursive multi-tree splitting using which the predetermined block is obtained, or a size of the predetermined block. Additionally or alternatively, the third context depends on whether, and discriminates between, the split direction flag indicating a horizontal split direction, and the split direction flag indicating a vertical split direction.

Another aspect concerns a method for decoding a picture, comprising a partitioning of the picture 12' into coding blocks using recursive multi-tree splitting depending on splitting information signaled in a data stream, and decoding the picture 12' from coding information which is signaled in the data stream and relates to the coding blocks. The method comprises partitioning the picture 12' into the coding blocks depending on splitting information signaled in a data stream by
    decoding a split flag and a quad flag of the splitting information from the data stream, wherein the split flag indicates whether a predetermined block of the picture 12' is to be split or not to be split thereby stopping the recursive multi-tree splitting with the predetermined block becoming one of the coding blocks, and the quad flag indicates whether the predetermined block of the picture 12' is to be split into four child blocks or not. If the predetermined block of the picture 12' is to be split, but not to be split into four child blocks, the partitioning of the picture comprises decoding one or more further flags of the splitting information from the data stream which indicate whether the predetermined block of the picture 12' is to be split into two or three child blocks vertically or horizontally. If the predetermined block of the picture 12' is to be split, the partitioning of the picture comprises resuming the recursive multi-tree splitting for the child blocks using even further flags of the splitting information. The method further comprises selecting one of a first mode and a second mode, and, in the first mode, decoding the quad flag after the split flag if the split flag indicates that the predetermined block of the picture 12' is to be split, and in the second mode, decoding the split flag after the quad flag if the quad flag indicates that the predetermined child block of the picture 12' is not to be split into four child blocks.

Another aspect concerns a method for encoding a picture, comprising a partitioning of the picture into coding blocks using recursive multi-tree splitting and encoding splitting information defining the partitioning in a data stream. The method further comprises encoding the picture into coding information which relates to the coding blocks and encoding the coding information in the data stream. Further, the method comprises encoding the splitting information in the data stream by encoding a split flag of the splitting information into the data stream which indicates whether a predetermined block of the picture is to be split or not to be split thereby stopping the recursive multi-tree splitting with the predetermined block becoming one of the coding blocks. If the split flag indicates that the predetermined block of the picture is to be split, the partitioning of the picture comprises encoding a quad flag of the splitting information into the data stream which indicates whether the predetermined block of the picture is to be split into four child blocks or not. If the quad flag indicates that the predetermined block of the picture is not to be split into four child blocks, the method comprises encoding one or more further flags of the splitting information into the data stream which indicate whether the predetermined block of the picture is to be split into two or three child blocks vertically or horizontally. If the split flag indicates that the predetermined block of the picture is to be split, the method comprises resuming the encoding the splitting information for the child blocks using even further flags of the splitting information.

Another aspect concerns a method for encoding a picture, comprising a partitioning of the picture into coding blocks using recursive multi-tree splitting and encoding splitting information defining the partitioning in a data stream. The method further comprises encoding the picture into coding information which relates to the coding blocks and encode the coding information in the data stream. Further, the method comprises encoding the splitting information in the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, the method comprises encoding a split direction flag into the data stream which indicates whether the predetermined block of the picture is to be split vertically or horizontally, if neither a second nor a third predetermined criterion is fulfilled. If the predetermined block of the picture is to be split, but not to be split into four child blocks, the method comprises suppressing the encoding of the split direction flag if the second predetermined criterion is fulfilled wherein same is to be inferred to indicate that predetermined block of the picture is to be split vertically, if the second predetermined criterion is fulfilled. If the predetermined block of the picture is to be split, but not to be split into four child blocks, the method comprises suppressing the encoding of the split direction flag if the third predetermined criterion is fulfilled wherein same is to be inferred to indicate that the predetermined block of the picture is to be split horizontally, if the third predetermined criterion is fulfilled. If the predetermined block of the picture is to be split, but not to be split into four child blocks, the method comprises encoding a triple flag into the data stream which indicates whether the predetermined block of the picture is to be split into three child blocks or into two child blocks, if a fourth predetermined criterion is not fulfilled. If the predetermined block of the picture is to be split, but not to be split into four child blocks, the method comprises suppressing the encoding the triple flag if the fourth predetermined criterion is fulfilled wherein same is to be inferred to indicate that the predetermined block of the picture is to be split into two child blocks, if the fourth predetermined criterion is fulfilled. If the predetermined block of the picture is to be split, the method comprises resuming the encoding of the splitting information for the child blocks using even further flags of the splitting information. The method further comprises encoding the split direction flag into the data stream by context adaptive entropy encoding using a second context which depends on whether, and discriminates between (i) the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical (ii) the fourth predetermined criterion would be fulfilled in case of the split direction indicated by the split direction flag being horizontal and not be fulfilled in case of the split direction indicated by the split direction flag being vertical, (iii) the fourth predetermined criterion would not be fulfilled in case of the split direction indicated by the split direction flag being horizontal and be fulfilled in case of the split direction indicated by the split direction flag being vertical.

Another aspect concerns a method for encoding a picture, comprising a partitioning of the picture into coding blocks using recursive multi-tree splitting and encoding splitting information defining the partitioning in a data stream. Further, the method comprises encoding the picture into coding information which is signaled in the data stream and relates to the coding blocks and encode the coding information in the data stream. The method comprises partitioning the picture into the coding blocks depending on splitting information signaled in a data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, the method comprises encoding a split direction flag into the data stream which indicates whether the predetermined block of the picture is to be split vertically or horizontally, if neither a second nor a third predetermined criterion is fulfilled. If the predetermined block of the picture is to be split, but not to be split into four child blocks, the method comprises suppressing the encoding of the split direction flag if the second predetermined criterion is fulfilled wherein same is to be inferred to indicate that predetermined block of the picture is to be split vertically, if the second predetermined criterion is fulfilled. If the predetermined block of the picture is to be split, but not to be split into four child blocks, the method comprises suppressing the encoding of the split direction flag if the third predetermined criterion is fulfilled wherein same is to be inferred to indicate that the predetermined block of the picture is to be split horizontally, if the third predetermined criterion is fulfilled. If the predetermined block of the picture is to be split, but not to be split into four child blocks, the method comprises encoding a triple flag into the data stream which indicates whether the predetermined block of the picture is to be split into three child blocks or into two child blocks, if fourth and fifth predetermined criteria are not fulfilled. If the predetermined block of the picture is to be split, but not to be split into four child blocks, the method comprises suppressing the encoding the triple flag if the fourth predetermined criterion is fulfilled wherein same is to be inferred to indicate that the predetermined block of the picture is to be split into two child blocks, if the fourth predetermined criterion is fulfilled. If the predetermined block of the picture is to be split, but not to be split into four child blocks, the method comprises suppressing the encoding the triple flag if the fifth predetermined criterion is fulfilled, wherein the triple flag is to be inferred to indicate that the predetermined block of the picture is to be split into three child blocks, if the fifth predetermined criterion is fulfilled. If the predetermined block of the picture is to be split, the method comprises resuming the encoding the splitting information for the child blocks using even further flags of the splitting information. The method comprises an encoding of the split direction flag into the data stream by context adaptive entropy encoding using a second context which depends on whether, and discriminates between, (i) a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical, (ii) the first number being greater than the second number, and (iii) the first number being smaller than the second number.

Another aspect concerns a method for encoding a picture, comprising a partitioning of the picture into coding blocks using recursive multi-tree splitting and encoding splitting information defining the partitioning in a data stream. The method further comprises encoding the picture into coding information which relates to the coding blocks and encode the coding information in the data stream. Further, the method comprises encoding the splitting information into the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, method comprises encoding a split direction flag into the data stream which indicates whether the predetermined block of the picture is to be split vertically or horizontally, and encoding a triple flag into the data stream which indicates whether the predetermined block of the picture is to be split into three child blocks or into two child blocks. If the predetermined block of the picture is to be split, the method comprises resuming the encoding the splitting information for the child blocks using even further flags of the splitting information. Further, the method comprises encoding the triple flag into the data stream by context adaptive entropy encoding using a third context which depends on a number of splits of the recursive multi-tree splitting using which the predetermined block is obtained, or a size of the predetermined block. Additionally or alternatively, the third context depends on whether, and discriminates between, the split direction flag indicating a horizontal split direction, and the split direction flag indicating a vertical split direction.

Another aspect concerns a method for encoding a picture, comprising a partitioning of the picture into coding blocks using recursive multi-tree splitting and encode splitting information defining the partitioning in a data stream, and an encoding the picture into coding information which relates to the coding blocks and encode the coding information in the data stream. Further, the method comprises encoding the splitting information into the data stream by encoding a split flag and a quad flag of the splitting information into the data stream, wherein the split flag indicates whether a predetermined block of the picture is to be split or not to be split thereby stopping the recursive multi-tree splitting with the predetermined block becoming one of the coding blocks, and the quad flag indicates whether the predetermined block of the picture is to be split into four child blocks or not. If the predetermined block of the picture is to be split, but not to be split into four child blocks, the method comprises encoding one or more further flags of the splitting information into the data stream which indicate whether the predetermined block of the picture is to be split into two or three child blocks vertically or horizontally. If the predetermined block of the picture is to be split, the method comprises resuming the encoding the splitting information for the child blocks using even further flags of the splitting information. Further, the method comprises selecting one of a first mode and a second mode, and, in the first mode, encoding the quad flag after the split flag if the split flag indicates that the predetermined block of the picture is to be split, and in the second mode, encoding the split flag after the quad flag if the quad flag indicates that the predetermined child block of the picture is not to be split into four child blocks.

The methods rely on the same ideas as the devices described above, providing equal or equivalent functionalities and advantages. The methods may optionally be combined with (or supplemented by) any of the features, functionalities and details described herein with respect to the corresponding device. The methods may optionally be combined with the mentioned features, functionalities and details both individually or in any combination of them.

BRIEF DESCRIPTION OF THE DRAWINGS

Embodiments of the present invention will be detailed subsequently referring to the appended drawings, in which:

FIG. 16 shows a flow chart of an embodiment of a method for decoding a picture,
FIG. 17 shows a flow chart of an embodiment of a method for decoding a picture,
FIG. 18 shows a flow chart of an embodiment of a method for decoding a picture,
FIG. 19 shows table 1,
FIG. 20 shows table 2,
FIG. 21 shows table 3,
FIG. 22 shows table 4,
FIG. 23 shows table 5.

DETAILED DESCRIPTION OF THE INVENTION

In the following, different inventive embodiments and aspects will be described. Also, further embodiments will be defined by the enclosed claims.

It should be noted that any embodiments as defined by the claims can be supplemented by any of the details (features and functionalities) described herein. Also, the embodiments described herein can be used individually, and can also optionally be supplemented by any of the details (features and functionalities) included in the claims. Also, it should be noted that individual aspects described herein can be used individually or in combination. Thus, details can be added to each of said individual aspects without adding details to another one of said aspects. It should also be noted that the present disclosure describes explicitly or implicitly features usable in encoding and decoding images/videos. Thus, any of the features described herein can be used in the context of encoding and decoding images/videos.

The invention will be understood more fully from the detailed description given below and from the accompanying drawings of embodiments of the invention, which, however, should not be taken to limit the invention to the specific embodiments described, but are for explanation and understanding only.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 1:
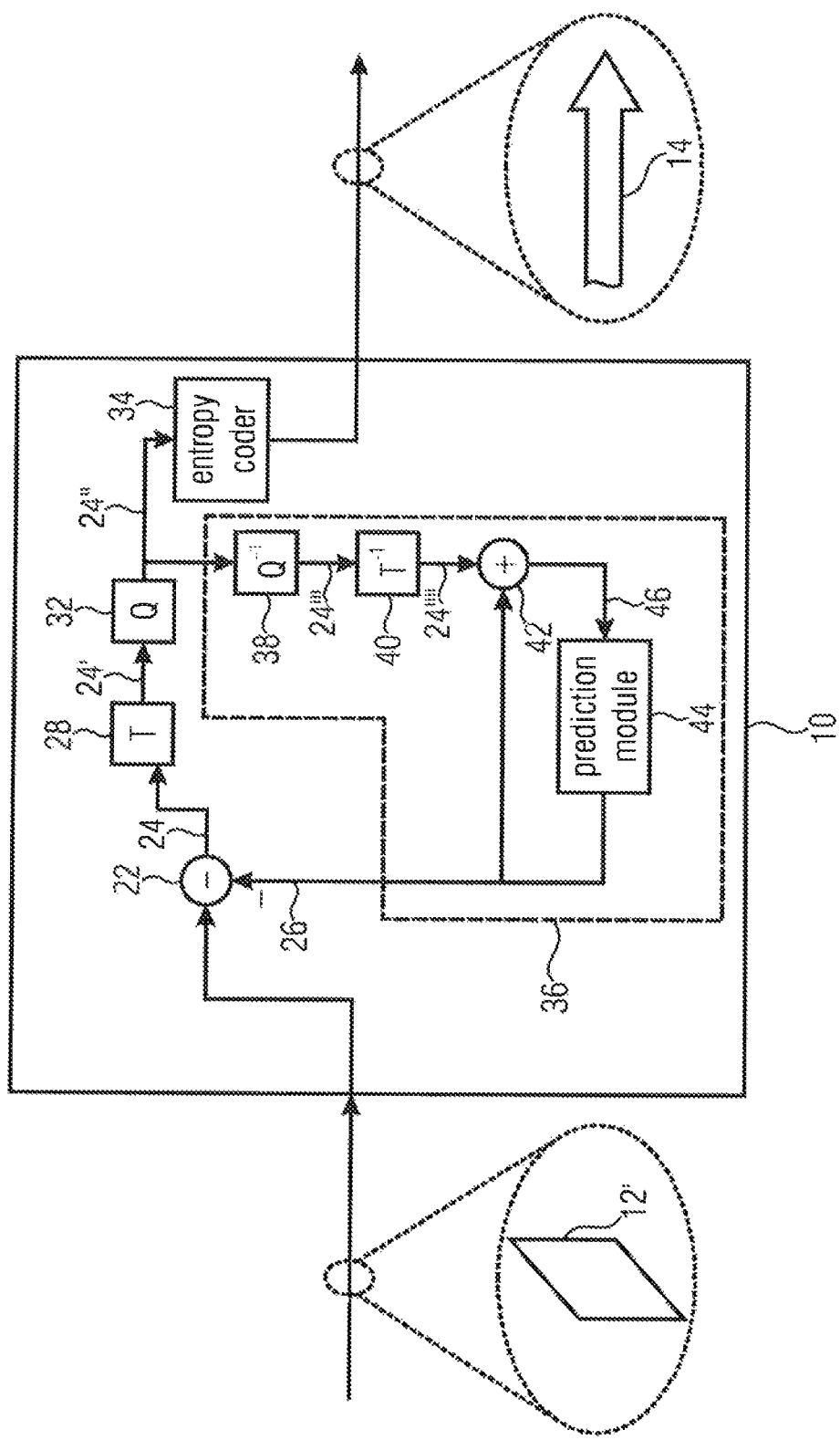
FIG. 1 shows a schematic representation of an apparatus for encoding a picture, which may implement the disclosed concept.
Figure 2:
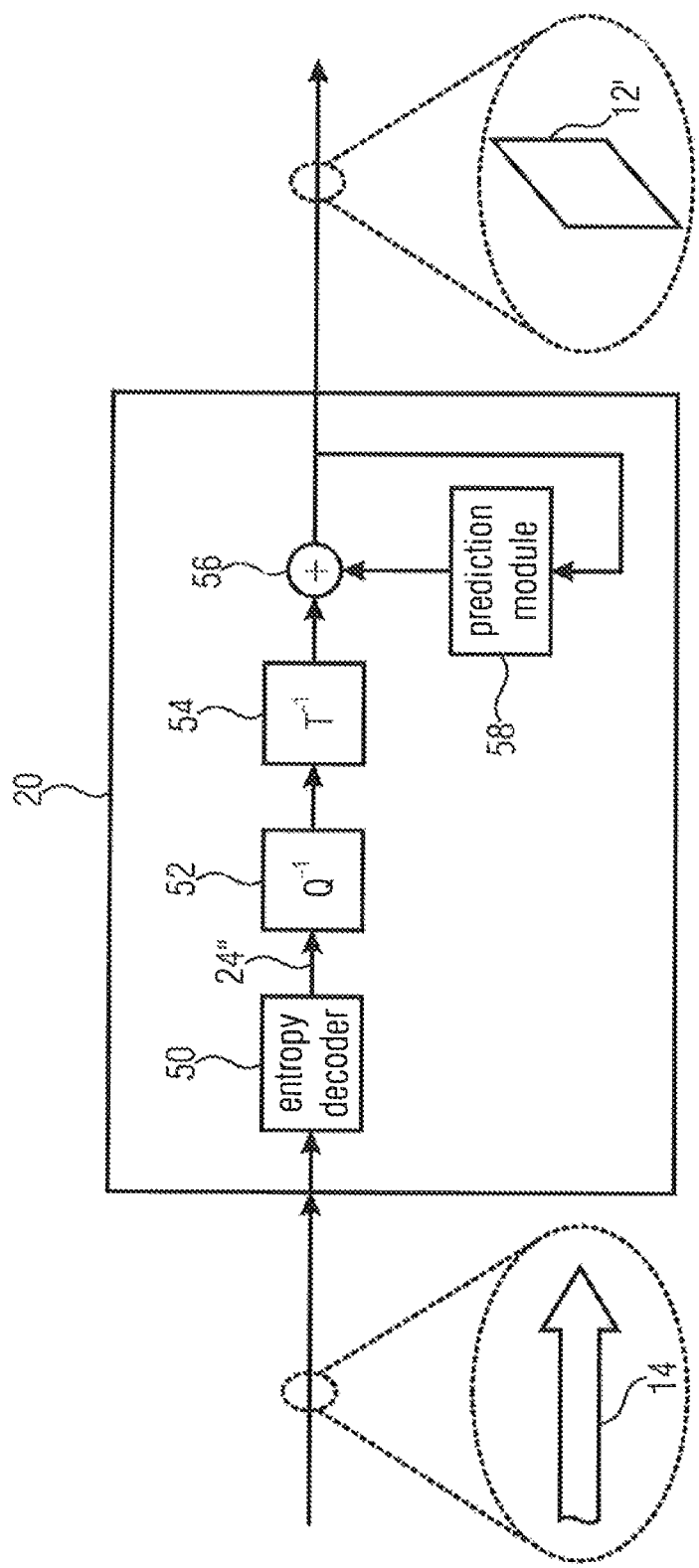
FIG. 2 shows a schematic representation of an apparatus for decoding a picture, which may implement the disclosed concept.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24'' is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24'' encoded into, and decodable from, data stream 14. To this end, the prediction stage 36 may internally, as is shown in FIG. 1, comprise a dequantizer 38 which dequantizes prediction residual signal 24'' so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
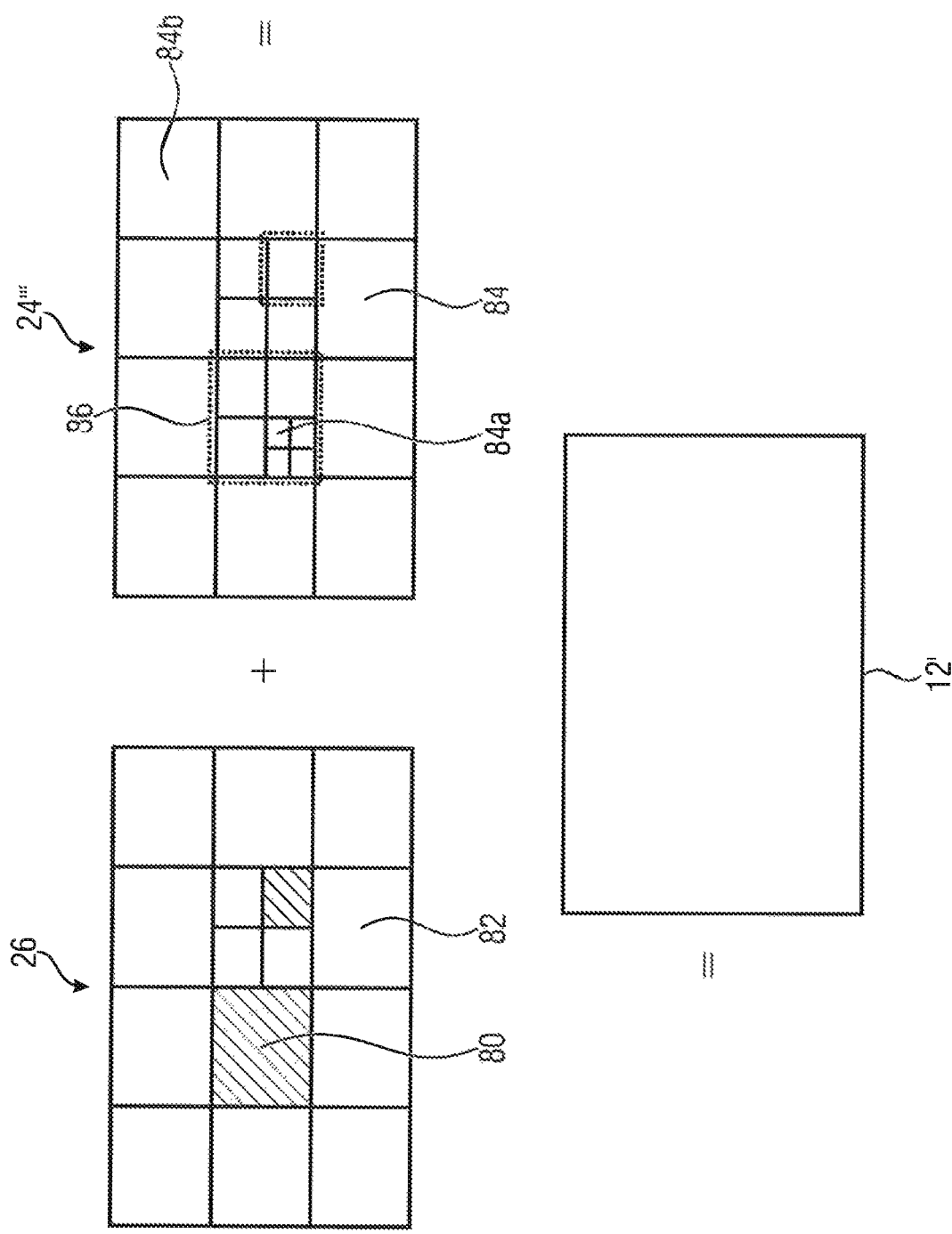
FIG. 3 illustrates signals used by encoders or decoders according to an embodiment.

FIG. 3 illustrates the relationship between the reconstructed signal, i.e. the reconstructed picture 12', on the one hand, and the combination of the prediction residual signal 24'' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block, for example a CTU, into a plurality of leaf blocks of varying size, for example CUs. The subdivision may be any subdivision, such as a quadtree subdivision or a binary or ternary subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks. Recursive multi-tree subdivisioning may also be referred to as recursive multi-tree splitting.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning (or recursive multi-tree splitting) of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'' directly results in the reconstructed signal 12'. However, it should be noted that more than one prediction signal 26 may be combined with the prediction residual signal 24'' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which schemes for subdivisioning or partitioning or splitting tree root blocks into one or more leaf blocks may be supported by the encoder 10 and the decoder 20. For example, these splitting schemes may provide means for obtaining the coding blocks 80, 82 and/or the transform blocks 84, 84a.

Figure 10A:
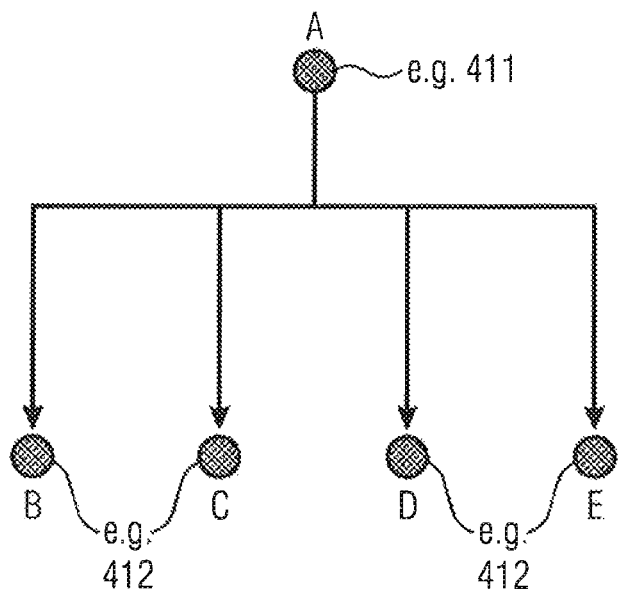
Figure 10B:
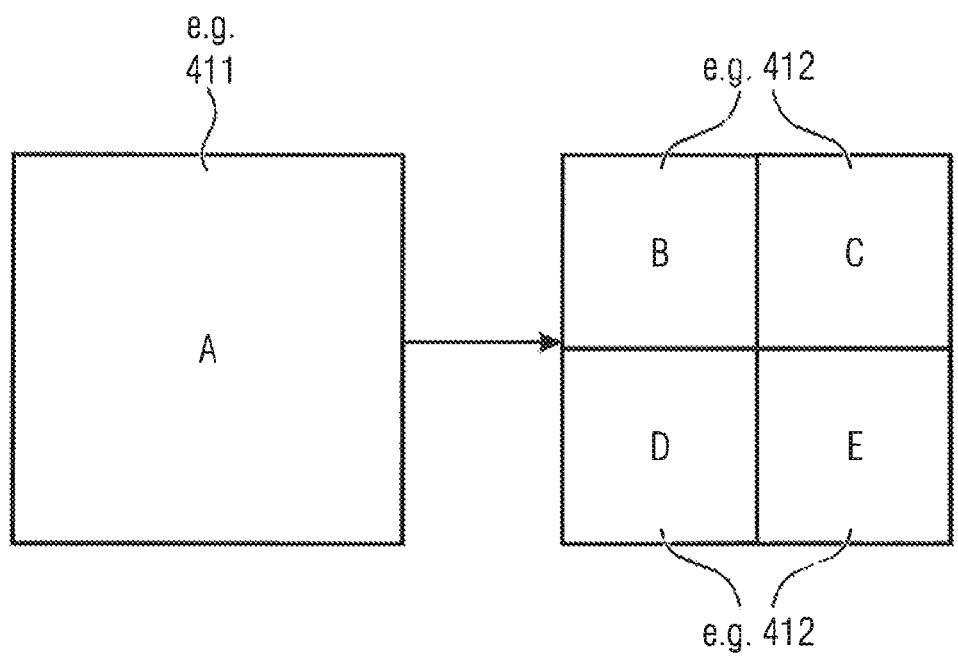

FIGS. 10A and 10B illustrate an example for a quadtree split and the resulting nodes, for example child blocks. FIG. 10A depicts the partitioning tree where a node A is further split into four nodes. FIG. 10B depicts the result on the partitioning where the block A is subdivided into four disjoint and equal sized blocks. For example, the splitting of the node A into the four nodes B, C, D, E as shown in FIGS.

10A and 10B may represent a splitting of a parent block into child blocks, as may be performed by one recursion of a recursive multi-tree splitting.

The partitioning as shown in FIGS. 10A and 10B may be applied recursively. That is, for example, the partitioning may partition a parent block into one or more child blocks, of which a child block may serve as the parent block for a further recursion of the partitioning. For example, a tree root block may be partitioned multiple times for obtaining one or more leaf blocks. For example, different tree leaf blocks may have been obtained by a different or same number of recursions of different or same types of partitioning, so that a form and a size of different tree leaf blocks may differ from each other. The number of recursions of partitioning for obtaining a specific block of the picture may, for example, be referred to as a tree depth of the specific block.

A scheme for splitting a parent block into a child block may comprise information about whether to split or not to split a parent block and information about how to split a parent block. Such a scheme may be illustrated by a partitioning tree.

Figure 11:
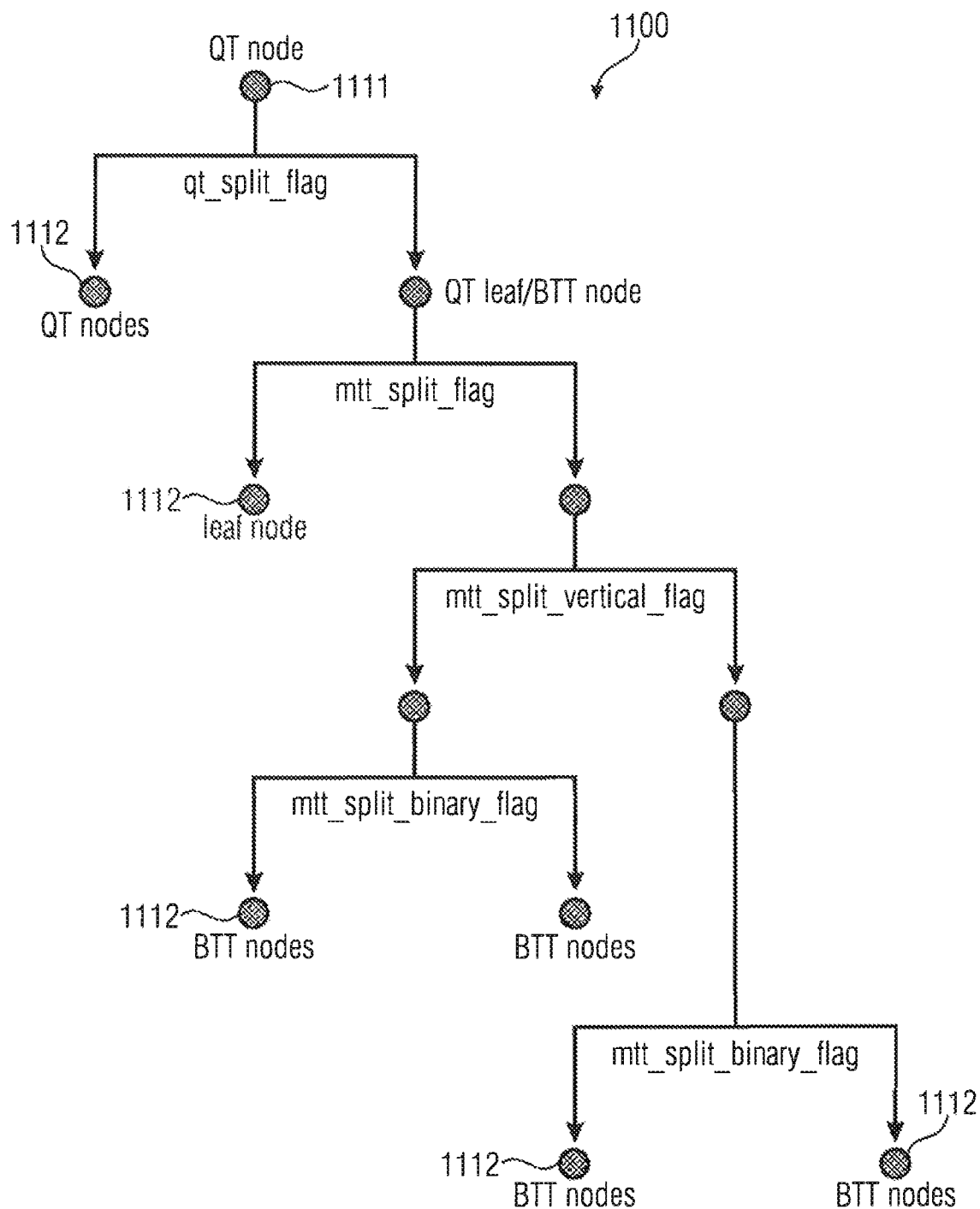
FIG. 11 illustrates a partitioning tree according to the current VVC.

FIG. 11 illustrates a partitioning tree 1100, e.g. a rule for splitting a parent block 1111 into one or more child blocks 1112, of the current VVC development having nested binary and ternary partitioning trees. In addition to the existing blocks, e.g. blocks known from previous codecs, resulting from quadtree splits, further rectangular shapes can be represented, e.g. by the partitioning tree 1100. A deviation from the quadtree can occur when the quadtree split flag is equal to zero. A binary-ternary-tree starts in the quad-tree leaf-nodes, for example if the quad-tree split flag indicates to not split the parent block 1111 into four child blocks. The binary-ternary-tree forms a recursive splitting tree, similarly to the quad-tree, but with different splits which might be applied at each node, e.g. each parent block, e.g. if the parent block is not split into four child blocks. Also, depending on specific node properties such as size, position or tree depth, not all splits are available at every node. Only flags that cannot be inferred based on already available data need to be transmitted. When the mtt_split_flag is either signaled or inferred to be equal to zero, the partitioning tree is terminated at this node (i.e., the corresponding node represents a leaf node and the associated block is used for prediction and transform coding).

As denoted in FIG. 2, up to four syntax elements may be used to specify the final CU shape. No further subdivision may use at least two syntax elements (qt_split_flag equal to 0 and mtt_split_flag equal to 0) in this scheme. The context modeling for the qt_split_flag is similar to the approach used in HEVC. The quadtree depth of the current node is compared to the final quadtree depths of the neighboring coding trees (the neighbor above the current block and the neighbor left to the current block). Furthermore, a separate context model set is used when the current quadtree depth is greater than one. Instead of the quadtree depth, the width and the height of the current node is compared relative to the width of the above and the height of the left neighbors for the mtt_split_flag. Three different context model sets are used depending on the current CU size for the luma component, whereas a dedicated context model set is used for the chroma components. Note that the current VVC draft allows different partitioning trees for luma and chroma when the slice type is intra, i.e., when the prediction inside the current picture (or slice or tile) is restricted to intra-picture prediction only.

The mtt_split_vertical_flag involves three context models depending on the aspect ratio of the current node: a context model for the case where the node is a square block, another for the case where the width is greater than the height, and a third for the opposite case. In contrast, a single context model is used for the mtt_split_binary_flag.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Figure 4:
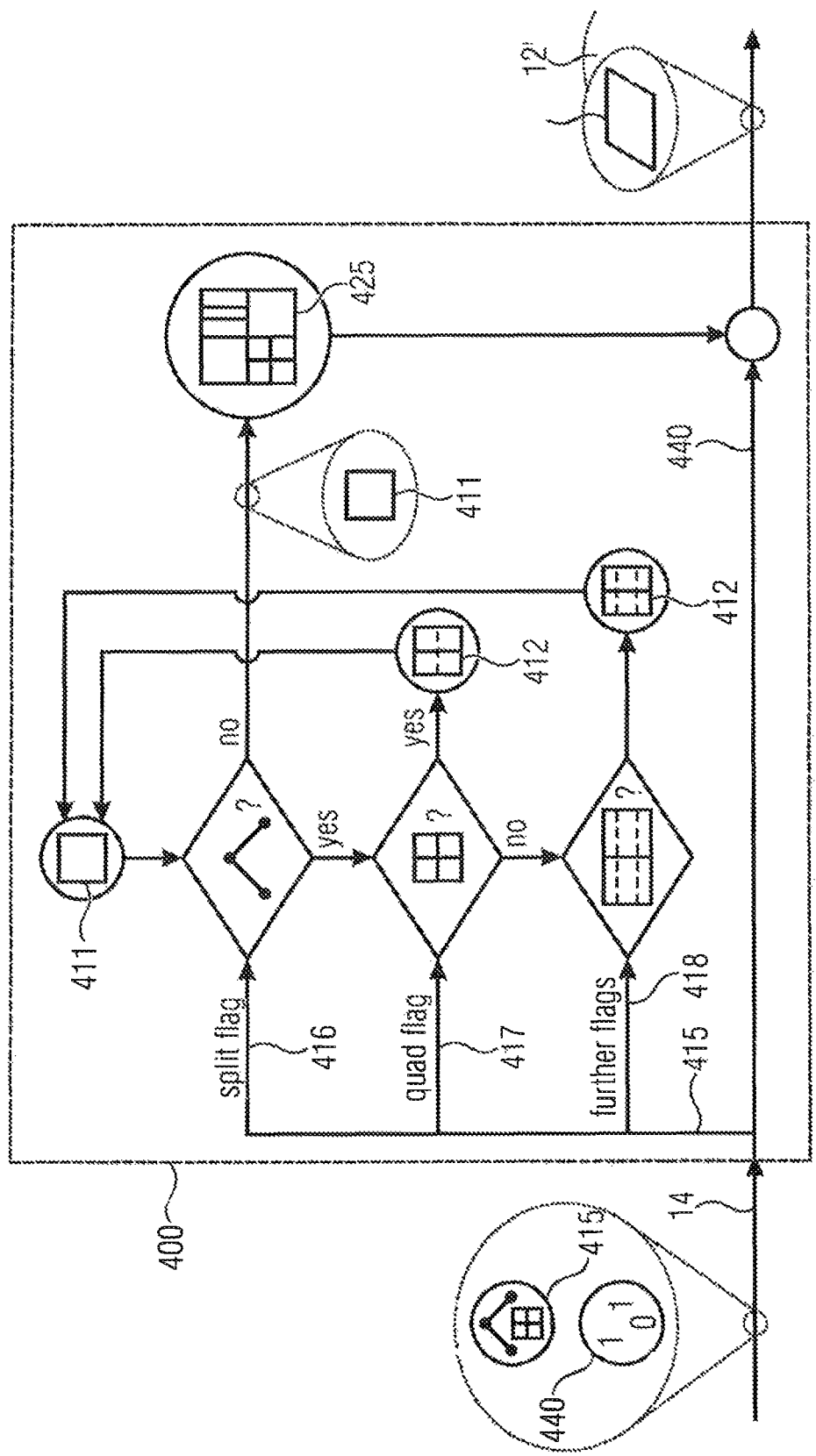
FIG. 4 shows a schematic representation of an apparatus for decoding a picture according to an embodiment.

FIG. 4 illustrates an apparatus 400 for decoding a picture 12' according to an embodiment of the present disclosure. For example the apparatus 400 may be similar to the decoder 20. The apparatus 400 is configured to partition the picture 12' into coding blocks 425 using recursive multi-tree splitting depending on the splitting information 415 signaled in the data stream 14. The apparatus 400 is further configured to decode the picture 12' from coding information 440 which is signaled in the data stream 14. The coding information 416 relates to the coding blocks 425. For partitioning the picture 12' into the coding blocks 425, the apparatus 400 is configured for decoding a split flag 416 of the splitting information 415 from the data stream 14. The split flag 416 indicates whether a predetermined block 411 of the picture 12' is to be split or not to be split, thereby stopping the recursive multi-tree splitting with the predetermined block 411 becoming one of the coding blocks 425. If the split flag 416 indicates that the predetermined block 411 of the picture 12' is to be split, the apparatus 400 is configured for decoding a quad flag 417 of the splitting information 415 from the data stream 14 which indicates whether the predetermined block 411 of the picture 12' is to be split into four child blocks 412 or not.

If the split flag 416 indicates that the predetermined block of the picture 12' is to be split, and if the quad flag 417 indicates that the predetermined block 411 of the picture 12' is not to be split into four child blocks 412, the partitioning of the picture 12' comprises decoding one or more further flags 418 of the splitting information 415 from the data stream 14 which indicate whether the predetermined block 411 of the picture 12' is to be split into two or three child blocks 412 vertically or horizontally.

Further, if the split flag 416 indicates that the predetermined block 411 of the picture 12' is to be split, the partitioning of the picture 12' comprises resuming the recursive multi-tree splitting for the child blocks 412 using even further flags of the splitting information 415. For example, in a further recursion of the recursive multi-tree splitting, one of the child blocks 412 may be the predetermined block 411.

For example, the apparatus 400 may be configured to receive the data stream 14, the data stream 14 comprising the splitting information 415 and the coding information 440. The apparatus 400 may further be configured to decode the picture 12' from the data stream to provide a decoded signal comprising the picture 12'. For example, the predetermined block 411 may be any block of the picture 12', which is subject to a current recursion of the recursive multi-tree splitting, that is, a block for which the current recursion may infer a splitting. For example the predetermined block 411 of a first recursion of the recursive multi-tree splitting may be a tree root block, such as a CTU.

If the split flag 416 indicates that the predetermined block 411 of the picture 12' is to be split, the apparatus 400 is configured for resuming the recursive multi-tree splitting for the child blocks of the predetermined blocks 411. The child blocks 412 may be the one or more sub-blocks of the predetermined block 411 resulting from partitioning the predetermined block. For example, the apparatus 400 is configured to resume the recursive multi-tree splitting by selecting one of the child blocks 412 of the predetermined block as the predetermined block 411 for a subsequent recursion of the partitioning and performing the partitioning as described for the predetermined block. For example, if the split flag 416 indicates that the predetermined block 411 of the picture 12' is not to be split, the apparatus 400 may be configured to stop the recursive multi-tree splitting with the predetermined block 411 becoming one of the coding blocks 425. The apparatus 400 may than continue the partitioning with another block, e.g. a sister block of the predetermined block or a sister block of a parent block of the predetermined block or another block.

Thus, according to an embodiment, the apparatus 400 is configured to resume the recursive multi-tree splitting for the child blocks 412 using even further flags of the splitting information 415 by, for a predetermined child block of the child blocks 412, decoding a further split flag 416 of the splitting information 415 from the data stream 14 which indicates whether the predetermined child block of the picture 12' is to be split or not to be split thereby stopping the recursive multi-tree splitting with the predetermined child block becoming a coding block. If the further split flag 416 indicates that the predetermined child block of the picture 12' is to be split, resuming the recursive multi-tree splitting for the child blocks 412 comprises decoding a further quad flag 417 of the splitting information 415 from the data stream 14 which indicates whether the predetermined child block of the picture 12' is to be split into four child blocks 412 or not. If the further split flag 416 indicates that the predetermined child block of the picture 12' is to be split, and if the further quad flag 417 indicates that the predetermined child block of the picture 12' is not to be split into four child blocks 412, resuming the recursive multi-tree splitting for the child blocks 412 comprises decoding one or more further flags 418 of the splitting information 415 from the data stream 14 which indicate whether the predetermined child block of the picture 12' is to be split into two or three child blocks 412 vertically or horizontally. Further, if the further split flag 416 indicates that the predetermined child block of the picture 12' is to be split, resuming the recursive multi-tree splitting for the child blocks 412 comprises resuming the recursive multi-tree splitting for the child blocks 412 of the predetermined child block using even further flags of the splitting information 415.

That is, for example, the apparatus 400 is configured to resume the recursive multi-tree splitting for the child blocks 412 by selecting one of the child blocks 425 that resulted from splitting the predetermined block 411 in a recursion of the recursive multi-tree splitting for a subsequent recursion of the recursive multi-tree splitting. For example, the recursive splitting may be stopped if the split flag 416 referring to the predetermined block 411 of the current recursion, e.g. the predetermined block or the predetermined child block, indicates that the predetermined block 411 is not to be split.

For example, in FIGS. 10A and 10B, the splitting of the node A into the four nodes B, C, D, E as shown in FIGS. 10A and 10B may represent a splitting of the predetermined block 411 into the child blocks 412, as may be a possible result of one recursion of the recursive multi-tree splitting as described with respect to the apparatus 400 and the apparatuses described with respect to subsequent figures.

Figure 12:
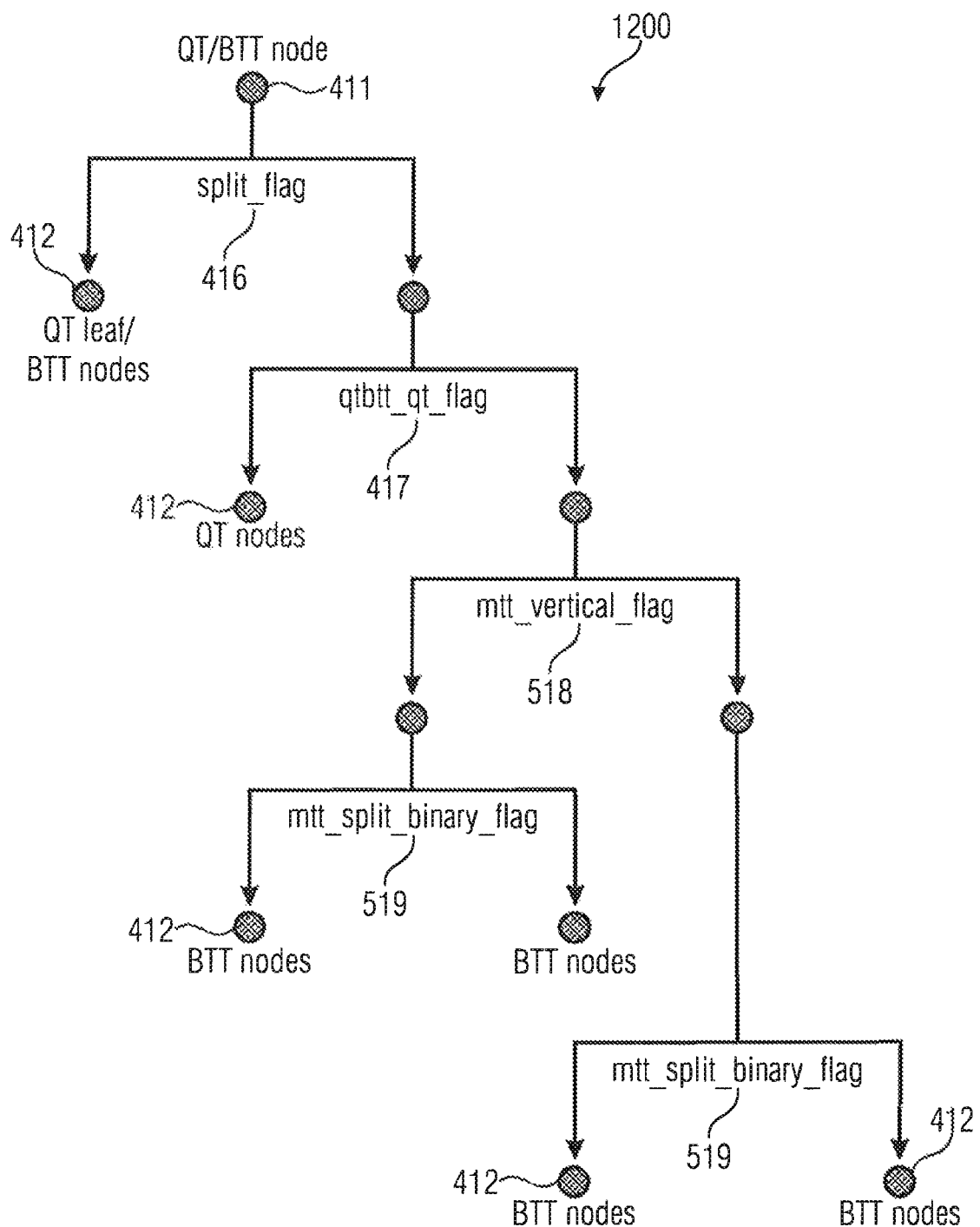
FIG. 12 illustrates a partitioning tree according to an embodiment.
Figure 13:
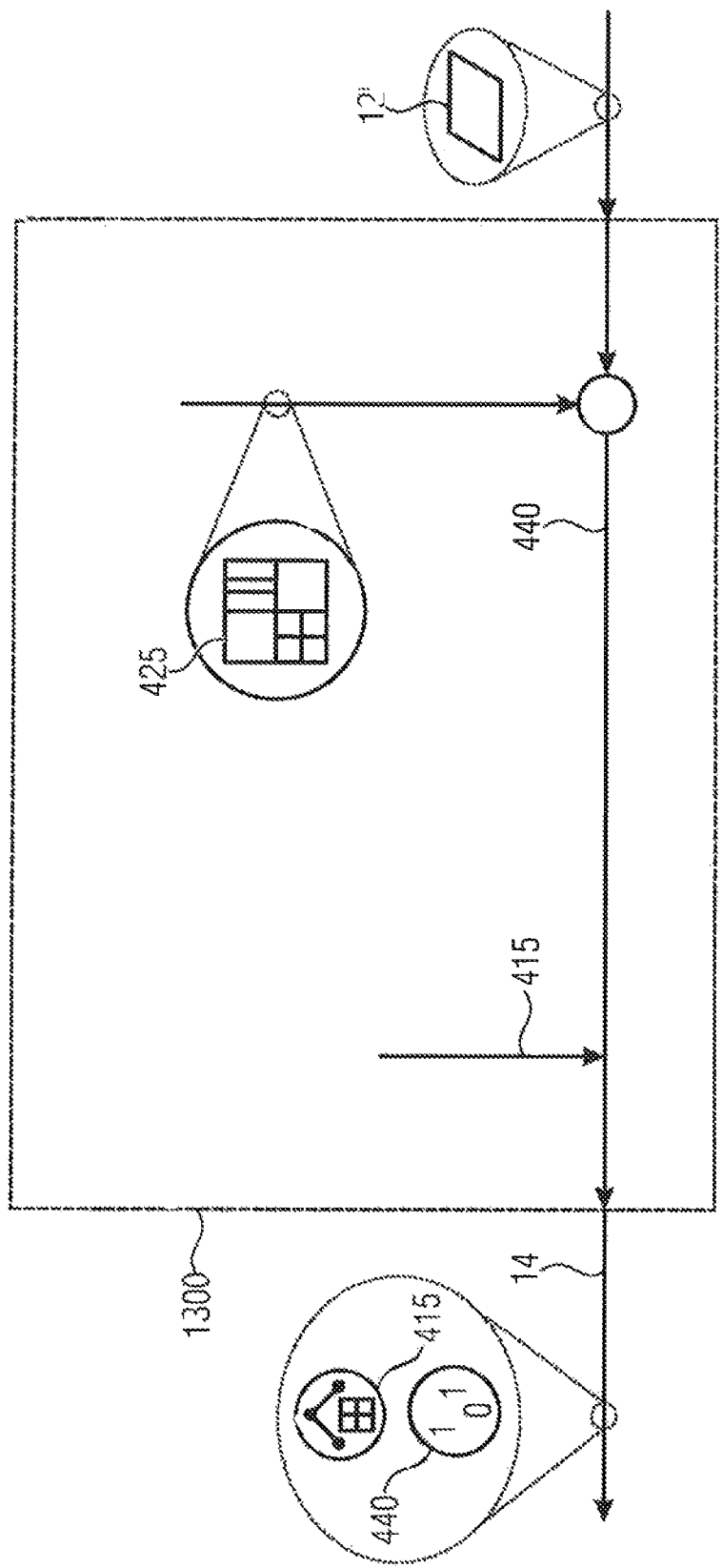
FIG. 13 shows a schematic representation of an apparatus for encoding a picture according to an embodiment.

FIG. 12 illustrates an alternative partitioning tree 1200 separating the split and the type information, e.g. an information about a type of the split. For example, the partitioning tree 1200 may represent one recursion of the recursive splitting according to an exemplary embodiment of the apparatus 400.

A property of the partitioning tree 1100 of FIG. 11 is that the "no further split" option involves the transmission of two syntax elements, e.g. it may involve indicating to not perform a quadtree split in a first syntax element and to indicate to not further split the parent block 1111 using a second syntax element. Since the split information can be represented interpedently of the shape type after the split information, an exemplary embodiment of the presented invention modifies the partitioning tree as shown in FIG. 12. Note that the syntax remains the same relative to the partitioning tree 1100 denoted in FIG. 11 when the second depth has been reached, i.e., when the mtt_vertical_flag is transmitted. Thus, the modification to the syntax elements mtt_vertical_flag and mtt_split_binary_flag is applicable to the binarization schemes depicted in both FIG. 11 and FIG. 12. For example, partitioning schemes of embodiments of the present invention may be similar to the partitioning tree 1100 of FIG. 1100, but may use a modified syntax for defining the splitting type. By separating the split and the type information, the cost for the no split option can be reduced, which can become important at lower bit rates operation points.

In other words, embodiments of the presented invention describe a generic concept that further improves the compression efficiency by involving adaptive tree structures and an associated context modeling.

For example, the partitioning trees illustrated in FIGS. 11 and 12 may only depict a common case where all options are possible. However, each node may inherit availability constraints. Examples for such constraints are size constraints, (e.g., no split is allowed that would results in child nodes having dimensions smaller than the minimal allowed block size), consecutive split restrictions (e.g., a quadtree split might only be signaled if the previous split was also a quadtree split). For these reasons, each of the syntax elements within the partitioning tree may slightly change their meaning depending on the particular availability constraints. That is, for example, some or all options for splitting may not be available for the predetermined block 411.

Embodiments of the invention may explicitly use the availability information, e.g. information about the available options for splitting the predetermined block 411, for the context modeling for the syntax elements of the partitioning tree. The availability information enriches the context modeling so that additional options, e.g. for the context modelling, are possible. For example, an information indicated by a predetermined flag of the splitting information 415 may be inferred by using the context model, so that said information may be inferred without decoding the predetermined flag. Thus, the splitting information 415 does not necessarily need to comprise the predetermined flag, so that the size of the data stream 14 may be reduced. For example, the context modelling may depend on one or more criteria.

In general, embodiments of the present invention may employ various implementations of partitioning trees for recursively splitting a picture. The partitioning may rely on a number of flags, each of which may indicate whether a splitting option, the respective flag refers to, is to be applied to a predetermined block which is subject to a current recursion of the recursive splitting. The flags may be part of a splitting information, which may be contained in a data stream. However, flags may also be inferred from said availability information. Further, for decoding the flags, from the data stream, or from the splitting information, context modelling may be used. For example, context modelling may use available information for reducing a number of possible options, so that one or more flags may be encoded to or decoded from less information, reducing a size of the data stream. For example, the partitioning of a picture may rely on one or more of the split flag 416, the quad flag 417, a split direction flag 518 and a triple flag 519. An exemplary order for evaluating such flags is shown in FIG. 12. Each of the embodiments described with respect to FIGS. 4-9 and 13-18 may employ different orders or dependencies or conditions for evaluating or decoding one or more of said flags. For example, different types for context modelling may be employed. Context modelling may, for example rely on the described availability information, or rely on information about neighboring blocks, e.g. block that have already been partitioned.

For example, a first context may be used for decoding the split flag 416, however different embodiments may employ different criteria or assumptions or information for deriving the first context.

For example, a second context may be used for decoding the split direction flag 418, however different embodiments may employ different criteria or assumptions or information for deriving the second context.

For example, a third context may be used for decoding the triple flag 419, however different embodiments may employ different criteria or assumptions or information for deriving the third context.

In other words, the context modeling for some or all syntax elements of the partitioning tree may depend only on the availability information. Second, the context modeling for some or all syntax elements of the partitioning tree may be a mix of the availability information with some other information, e.g the partitioning structure information of the neighboring blocks (tree depth or size).

According to an embodiment, the apparatus 400 is configured to infer, depending on one or more criteria being fulfilled or not, that one or more flags of the splitting information 415 assume a predetermined flag state with not decoding the one or more flags of the splitting information 415 from the data stream 14.

For example, the data stream 14 does not necessarily comprise all or any of the split flag 416, the quad flag 417 and the further flags 418 for the predetermined block. For example, the apparatus 400 may be configured to infer a flag state of one or more or all of said flags for the predetermined block, for example from information about the predetermined block 411 or about neighboring blocks.

According to an embodiment, the one or more criteria relate to one or more of child block area, child block width, child block height, a current split depth and a split line alignment with a picture border. For example, there may be a lower limit for the area, the width, or the height of the child blocks 425 that result from a splitting of the predetermined block 411. The apparatus 400 may predict said measures for the child blocks 425, from which the apparatus 400 may infer that the one or more flags of the splitting information 415, e.g. the split flag 416, the quad flag 417 or the one or more further flags 418, assume a predetermined flag state. For example, the apparatus 400 may infer from the said measures, that the predetermined block 411 is not to be split further, or that the predetermined block 411 is not to be split into four child blocks 412. For example, the current split depth may refer to a tree depth or a quad-tree depth, that is, for example, a number of recursions of the recursive splitting that were performed to obtain the predetermined block 411.

According to an embodiment, the apparatus 400 is configured to start the recursive multi-tree splitting at each tree-root block of tree-root blocks into which the picture 12' is subdivided in rows and columns.

According to an embodiment, the apparatus 400 is configured to start the recursive multi-tree splitting at tree-root blocks into which the picture 12' is subdivided in rows and columns.

According to an embodiment, the apparatus 400 is configured to infer that the quad flag 417 indicates that the predetermined block 411 of the picture 12' is not to be split into four child blocks 412 and suppress the decoding of the quad flag 417 from the data stream 14, if a first predetermined criterion is fulfilled.

According to an embodiment, the apparatus 400 is configured so that the first predetermined criterion is fulfilled if the predetermined block 411 results from a non-quad split of a parent block.

According to an embodiment, the apparatus 400 is configured to, in the decoding of the one or more further flags 418, decode a split direction flag from the data stream 14 which indicates whether the predetermined block 411 of the picture 12' is to be split vertically or horizontally. Further, for decoding the one or more further flags 418, the apparatus 400 may be configured to decode a triple flag from the data stream 14 which indicates whether the predetermined block 411 of the picture 12' is to be split into three child blocks 412 or into two child blocks 412.

According to an embodiment, the apparatus 400 is configured to infer that the split direction flag indicates that the predetermined block 411 of the picture 12' is to be split vertically and suppress the decoding of the split direction flag from the data stream 14, if a second predetermined criterion is fulfilled, and infer that the split direction flag indicates that the predetermined block 411 of the picture 12' is to be split horizontally and suppress the decoding of the split direction flag from the data stream 14, if a third predetermined criterion is fulfilled.

According to an embodiment, the second predetermined criterion is fulfilled if halving the predetermined block 411 horizontally would yield a width falling below a predetermined minimum dimension, and the third predetermined criterion is fulfilled if halving the predetermined block 411 vertically would yield a height falling below the predetermined minimum dimension.

According to an embodiment, the apparatus 400 is configured to infer that the triple flag indicates that the predetermined block 411 of the picture 12' is to be split into two child blocks 412 and suppress the decoding of the triple flag from the data stream 14, if a fourth predetermined criterion is fulfilled.

According to an embodiment, the apparatus 400 is configured to infer that the triple flag indicates that the predetermined block 411 of the picture 12' is to be split into two child blocks 412 and suppress the decoding of the triple flag from the data stream 14, if a fourth predetermined criterion is fulfilled, and the apparatus 400 is further configured to infer that the triple flag indicates that the predetermined block 411 of the picture 12' is to be split into three child blocks 412 and suppress the decoding of the triple flag from the data stream 14, if a fifth predetermined criterion is fulfilled.

According to an embodiment, the fourth predetermined criterion is fulfilled if trisecting the predetermined block 411 in a split direction indicated by the direction flag would yield a dimension of the predetermined block 411 along the split direction which split falls below a predetermined minimum dimension.

According to an embodiment, the fifth predetermined criterion is fulfilled if halving the predetermined block 411 in a split direction indicated by the direction flag would yield a dimension of the predetermined block 411 along the split direction which exceeds a predetermined maximum dimension.

According to an embodiment, the apparatus 400 is configured to resume the recursive multi-tree splitting for the child blocks 412 using even further flags of the splitting information 415 by, for a predetermined child block of the child blocks 412, decoding a further quad flag 417 of the splitting information 415 from the data stream 14 which indicates whether the predetermined child block of the picture 12' is to be split into four child blocks 412 or not. If the further quad flag 417 indicates that the predetermined child block of the picture 12' is not to be split into four child blocks 412, resuming the recursive multi-tree splitting for the predetermined child block comprises decoding a further split flag 416 of the splitting information 415 from the data stream 14 which indicates whether the predetermined child block of the picture 12' is to be split, or not to be split thereby stopping the recursive multi-tree splitting with the predetermined child block becoming a coding block. If the further quad flag 417 indicates that the predetermined child block of the picture 12' is not to be split into four child blocks 412, and if the further split flag 416 indicates that the predetermined child block of the picture 12' is to be split, resuming the recursive multi-tree splitting for the predetermined child block comprises decoding one or more further flags 418 of the splitting information 415 from the data stream 14 which indicate whether the predetermined child block of the picture 12' is to be split into two or three child blocks 412 vertically or horizontally. If the further quad flag 417 indicates that the predetermined child block of the picture 12' is not to be split into four child blocks 412, or if the further split flag 416 indicates that the predetermined child block of the picture 12' is to be split, resuming the recursive multi-tree splitting for the predetermined child block comprises resuming the recursive multi-tree splitting for the child blocks 412 of the predetermined child block using even further flags of the splitting information 415. That is, for example, an order of the split flag 416 and the quad flag 417 may be different for different recursions of the recursive splitting.

According to an embodiment, the apparatus 400 is configured to infer that the quad flag 417 indicates that the predetermined block 411 of the picture 12' is not to be split into four child blocks 412 and suppress the decoding of the quad flag 417 from the data stream 14, if a first predetermined criterion is fulfilled. According to this embodiment, the apparatus 400 is further configured to decode the split flag 416 of the splitting information 415 from the data stream 14 by context adaptive entropy decoding using a first context which depends on whether the first predetermined criterion is fulfilled.

For example, in the binarization presented in FIG. 12, split_flag, e.g. the split flag 416, might be modelled as shown in Table 1 (c.f. FIG. 19), conditioned on the following information:
  Availability of the quadtree split (QT)
  The current quadtree depth
  The current width and height
  The current luma area
  The width of the above neighbor
  The height of the left neighbors.

Table 1, shown in FIG. 19, shows an exemplarily context modeling for the syntax element split_flag, e.g. the split flag 416, using availability information and existing context modeling. The context modeling is conditioned to the availability of the quadtree split (QT), the current quadtree depth, the current width and height, the current luma area (W×H), and the width of the above neighbor and height of the left neighbor.

According to an embodiment, the first context additionally depends on a number of splits of the recursive multi-tree splitting using which the predetermined block 411 is obtained. For example, such a dependence may be modeled as shown in the second column of Tab. 1. Alternatively or additionally, the first context additionally depends on a size of the predetermined block 411. For example, such a dependence may be modeled as shown in the third column of Tab. 1.

According to an embodiment, the first context additionally depends on whether, and discriminates between, a number of splits of the recursive multi-tree splitting using which the predetermined block 411 is obtained, is below a predetermined threshold number of splits. Alternatively, the first context additionally depends on [whether], and discriminates between, whether a size of the predetermined block 411 is above a predetermined threshold size.

According to an embodiment, the first context additionally depends on a width of a coding block above the predetermined block 411, and a height of a coding block to the left of the predetermined block 411. An example of such a dependence of a context model is shown in the fourth and fifth column of Tab. 1.

According to an embodiment, the first context additionally depends on whether, and discriminates between:
  a width of a coding block above the predetermined block 411 is smaller than a width of the predetermined block 411 and a height of a coding block to the left of the predetermined block 411 is smaller than a height of the predetermined block 411
  the width of the coding block above the predetermined block 411 is smaller than the width of the predetermined block 411 and the height of the coding block to the left of the predetermined block 411 is larger than the height of the predetermined block 411
  the width of the coding block above the predetermined block 411 is smaller than the width of the predetermined block 411 and the height of the coding block to the left of the predetermined block 411 is larger than the height of the predetermined block 411 or the width of the coding block above the predetermined block 411 is larger than the width of the predetermined block 411 and the height of the coding block to the left of the predetermined block 411 is smaller than the height of the predetermined block 411

For example, such a dependence of a context model is represented in by the context modelling shown in Tab. 1 in FIG. 19.

According to an embodiment, the apparatus 400 is configured to perform the splitting into four child blocks 412 so that the four child blocks 412 are equally sized and arranged in a 2×2 array. According to this embodiment, the apparatus 400 is configured to perform the recursive multi-tree splitting using a depth first traversal order and traverse child blocks resulting from splitting one parent block from left to right in case of a horizontal split, from top to bottom in case of a vertical split and in a row-wise raster scan order from top left to bottom right in case of a splitting into four child blocks 412.

According to an embodiment, for the decoding of one or more further flags 418 of the splitting information 415 from the data stream 14 which indicate whether the predetermined child block of the picture 12' is to be split into two or three child blocks 412 vertically or horizontally, the apparatus 400 is configured to decode a split direction flag from the data stream 14 which indicates whether the predetermined block 411 of the picture 12' is to be split vertically or horizontally, and further, to decode a triple flag from the data stream 14 which indicates whether the predetermined block 411 of the picture 12' is to be split into three child blocks 412 or into two child blocks 412. Further, if a first predetermined criterion is fulfilled, the apparatus 400 is configured to infer that the quad flag 417 indicates that the predetermined block 411 of the picture 12' is not to be split into four child blocks 412 and to suppress the decoding of the quad flag 417 from the data stream 14. If a second predetermined criterion is fulfilled, the apparatus is configured to infer that the split direction flag indicates that the predetermined block 411 of the picture 12' is to be split vertically and suppress the decoding of the split direction flag from the data stream 14. If a third predetermined criterion is fulfilled, the apparatus 400 is configured to infer that the split direction flag indicates that the predetermined block 411 of the picture 12' is to be split horizontally and configured to suppress the decoding of the split direction flag from the data stream 14. If a fourth predetermined criterion is fulfilled, the apparatus 400 is configured to infer that the triple flag indicates that the predetermined block 411 of the picture 12' is to be split into two child blocks 412 and suppress the decoding of the triple flag from the data stream 14. Further, the apparatus is configured to decode the split flag 416 of the splitting information 415 from the data stream 14 by context adaptive entropy decoding using a first context which depends on a sum of addends each of which is associated with, and assumes a non-zero value if, while being zero otherwise, one of the following scenarios is fulfilled:

the first predetermined criterion is not fulfilled,
the second predetermined criterion is not fulfilled,
the third predetermined criterion is not fulfilled,
the second predetermined criterion is not fulfilled and the fourth predetermined criterion would not be fulfilled in case of a split direction indicated by the split direction flag being horizontal,
the third predetermined criterion is not fulfilled and the fourth predetermined criterion would not be fulfilled in case of the split direction indicated by the split direction flag being vertical, respectively.

For example, here, if is implied that Tx implies Bx; the concordance with above description is described using following Boolean logic rules below:

First predetermined criterion: not QT, i.e. QT
Second predetermined criterion: not ((not BH) and (not TH)), i.e. BH or TH
Third predetermined criterion: not ((not BV) and (not TV)), i.e. BV or TV
Fourth predetermined criterion: (not ((not BH) and (not TH))) and (not (not TH)), i.e. (BH or TH) and TH, i.e. TH
Fifth predetermined criterion: (not ((not BV) and (not TV))) and (not (not TV)), i.e. (BV or TV) and TV, i.e. TV.

According to an embodiment, the apparatus 400 is configured to, in the decoding of one or more further flags 418 of the splitting information 415 from the data stream 14 which indicate whether the predetermined child block of the picture 12' is to be split into two or three child blocks 412 vertically or horizontally, decode a split direction flag from the data stream 14 which indicates whether the predetermined block 411 of the picture 12' is to be split vertically or horizontally, and to decode a triple flag from the data stream 14 which indicates whether the predetermined block 411 of the picture 12' is to be split into three child blocks 412 or into two child blocks 412. The apparatus 400 is further configured to infer that the quad flag 417 indicates that the predetermined block 411 of the picture 12' is not to be split into four child blocks 412 and configured to suppress the decoding of the quad flag 417 from the data stream 14, if a first predetermined criterion is fulfilled. The apparatus 400 is further configured to infer that the split direction flag indicates that the predetermined block 411 of the picture 12' is to be split vertically and suppress the decoding of the split direction flag from the data stream 14, if a second predetermined criterion is fulfilled. The apparatus 400 is further configured to infer that the split direction flag indicates that the predetermined block 411 of the picture 12' is to be split horizontally and suppress the decoding of the split direction flag from the data stream 14, if a third predetermined criterion is fulfilled. The apparatus 400 is further configured to infer that the triple flag indicates that the predetermined block 411 of the picture 12' is to be split into two child blocks 412 and suppress the decoding of the triple flag from the data stream 14, if a fourth predetermined criterion is fulfilled, and to infer that the triple flag indicates that the predetermined block 411 of the picture 12' is to be split into three child blocks 412 and suppress the decoding of the triple flag from the data stream 14, if a fifth predetermined criterion is fulfilled. The apparatus 400 is further configured to decode the split flag 416 of the splitting information 415 from the data stream 14 by context adaptive entropy decoding using a first context which depends on a sum of addends each of which is associated with one of the following scenarios. Each of the addends assumes a non-zero value if, while being zero otherwise, the respective scenario is fulfilled:

the first predetermined criterion is not fulfilled
the second predetermined criterion is not fulfilled, and the fifth predetermined criterion would not be fulfilled in case of the split direction indicated by the split direction flag being horizontal the third predetermined criterion is not fulfilled, and the fifth predetermined criterion would not be fulfilled in case of the split direction indicated by the split direction flag being vertical the second predetermined criterion is not fulfilled and the fourth predetermined criterion would not be fulfilled in case of the split direction indicated by the split direction flag being horizontal the third predetermined criterion is not fulfilled and the fourth predetermined criterion would not be fulfilled in case of the split direction indicated by the split direction flag being vertical, respectively.

According to an embodiment, the first context additionally depends on whether, and discriminates between, a third of the sum of addends plus one is zero, one and two. According to this embodiment, the non-zero value of the addend associated with the first predetermined criterion being not fulfilled is two, and the non-zero values of the other addends are one.

According to an embodiment, the first context additionally depends on a width of a coding block above the predetermined block 411, and a height of a coding block to the left of the predetermined block 411.

According to an embodiment, the first context additionally depends on whether, and discriminates between:

a width of a coding block above the predetermined block 411 is smaller than a width of the predetermined block 411 and a height of a coding block to the left of the predetermined block 411 is smaller than a height of the predetermined block 411 the width of the coding block above the predetermined block 411 is smaller than the width of the predetermined block 411 and the height of the coding block to the left of the predetermined block 411 is larger than the height of the predetermined block 411 the width of the coding block above the predetermined block 411 is smaller than the width of the predetermined block 411 and the height of the coding block to the left of the predetermined block 411 is larger than the height of the predetermined block 411 or the width of the coding block above the predetermined block 411 is larger than the width of the predetermined block 411 and the height of the coding block to the left of the predetermined block 411 is smaller than the height of the predetermined block 411

In other words, the modelling of the split_flag, e.g. the first context for decoding the split flag 416, might depend on the number of available splits $N_s$, defined as follows: $N_s$=(2·QT+BH+BV+TH+TV−1), where QT, BH, BV, TH and TV represent the availability of the quad split, binary horizontal, binary vertical, ternary horizontal and ternary vertical splits. The alternative context modeling, e.g. for the first context for decoding the split flag 416, may thus depends on the following:

Number of available splits $N_s$
The current width and height
The width of the above neighbor
The height of the left neighbors Table 2, shown in FIG. 20, shows this alternative context modeling for the syntax element split_flag, e.g. the split flag 416, depending on the availability of all the splits, as well as the sizes of neighboring blocks.

Figure 5:
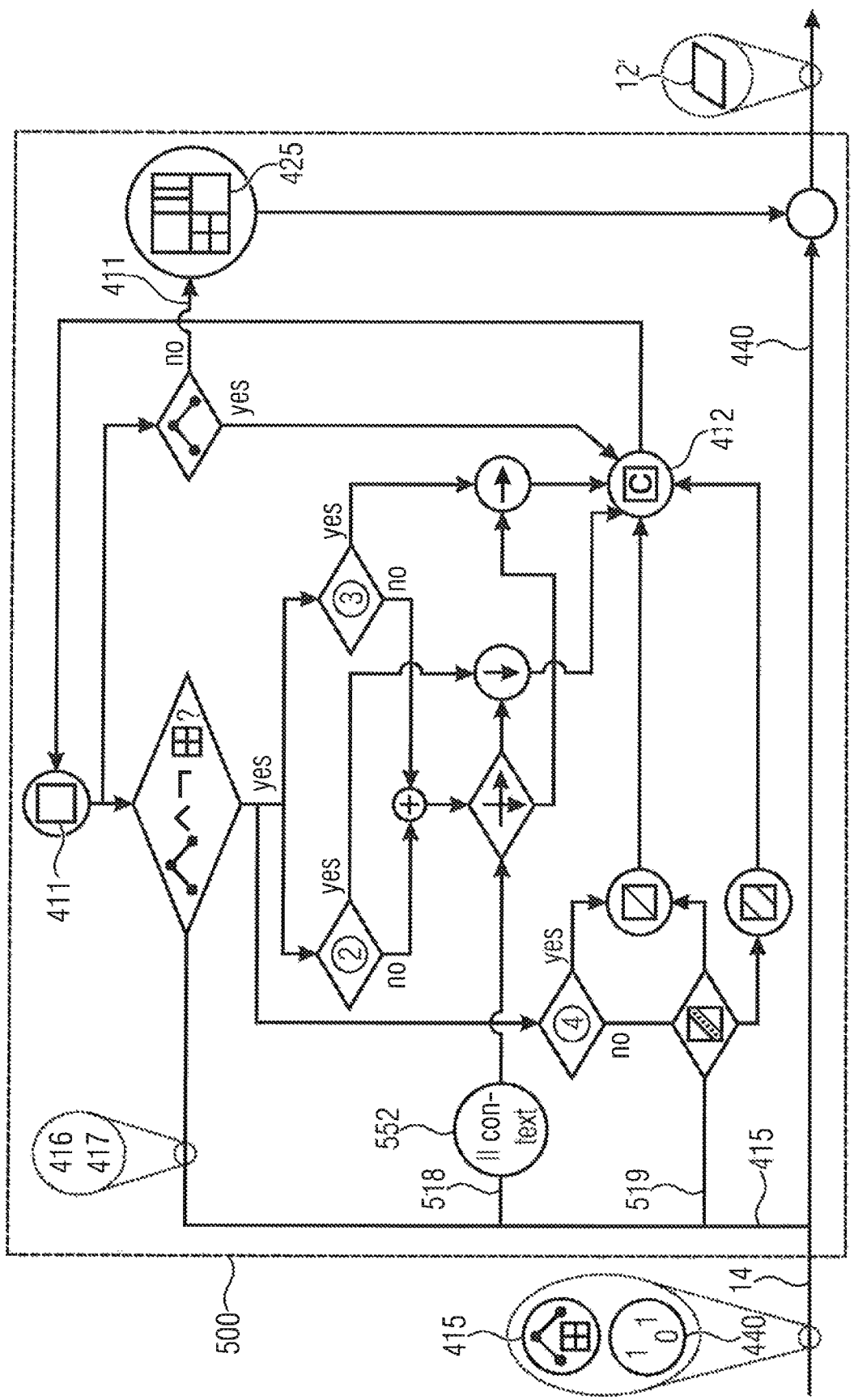
FIG. 5 shows a schematic representation of an apparatus for decoding a picture according to a further embodiment.
Figure 6:
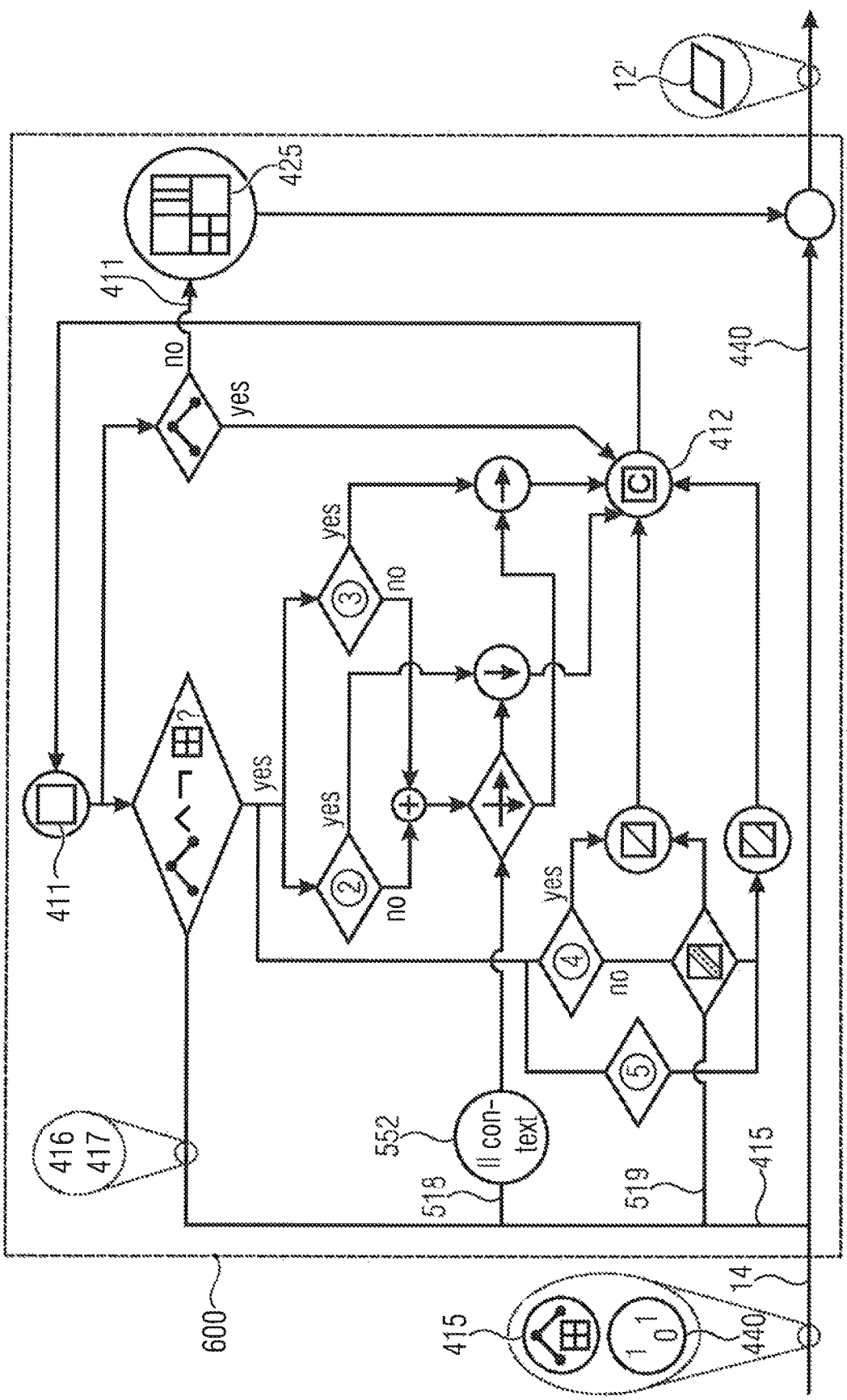
FIG. 6 shows a schematic representation of an apparatus for decoding a picture according to a further embodiment.

According to an embodiment, the apparatus 400 is configured to, in the decoding of the one or more further flags 418 of the splitting information 415 from the data stream 14 which indicate whether the predetermined child block of the picture 12' is to be split into two or three child blocks 412 vertically or horizontally, decode a split direction flag from the data stream 14 which indicates whether the predetermined block 411 of the picture 12' is to be split vertically or horizontally, if neither a second nor a third predetermined criterion is fulfilled. If the second predetermined criterion is fulfilled, the decoding of the one or more further flags 418 comprises inferring that the split direction flag indicates that the predetermined block 411 of the picture 12' is to be split vertically. If the third predetermined criterion is fulfilled, the decoding of the one or more further flags 418 comprises inferring that the split direction flag indicates that the predetermined block 411 of the picture 12' is to be split horizontally. If a fourth predetermined criterion is not fulfilled, the decoding of the one or more further flags 418 comprises decoding a triple flag from the data stream 14 which indicates whether the predetermined block 411 of the picture 12' is to be split into three child blocks 412 or into two child blocks 412. If the fourth predetermined criterion is fulfilled, the decoding of the one or more further flags 418 comprises inferring that the triple flag indicates that the predetermined block 411 of the picture 12' is to be split into two child blocks 412. Further, the apparatus 400 is configured to decode the split direction flag from the data stream 14 by context adaptive entropy decoding using a second context which depends on whether, and discriminates between:

the fourth predetermined criterion would not neither be fulfilled in case of a split direction indicated by the split direction flag being horizontal nor in case of the split direction indicated by the split direction flag being vertical or be fulfilled both in case of a split direction indicated by the split direction flag being horizontal as well as in case of the split direction indicated by the split direction flag being vertical the fourth predetermined criterion would be fulfilled in case of the split direction indicated by the split direction flag being horizontal and not be fulfilled in case of the split direction indicated by the split direction flag being vertical the fourth predetermined criterion would not be fulfilled in case of the split direction indicated by the split direction flag being horizontal and be fulfilled in case of the split direction indicated by the split direction flag being vertical According to an embodiment, the apparatus 400 is configured to, in the decoding of one or more further flags 418 of the splitting information 415 from the data stream 14 which indicate whether the predetermined child block of the picture 12' is to be split into two or three child blocks 412 vertically or horizontally, decode a split direction flag from the data stream 14 which indicates whether the predetermined block 411 of the picture 12' is to be split vertically or horizontally, if neither a second nor a third predetermined criterion is fulfilled. If the second predetermined criterion is fulfilled, the decoding of the one or more further flags 418 comprises inferring that the split direction flag indicates that the predetermined block 411 of the picture 12' is to be split vertically. If the third predetermined criterion is fulfilled, the decoding of the one or more further flags 418 comprises inferring that the split direction flag indicates that the predetermined block 411 of the picture 12' is to be split horizontally. If fourth and fifth predetermined criteria are not fulfilled, the decoding of the one or more further flags 418 comprises decoding a triple flag from the data stream 14 which indicates whether the predetermined block 411 of the picture 12' is to be split into three child blocks 412 or into two child blocks 412. If the fourth predetermined criterion is fulfilled, the decoding of the one or more further flags 418 comprises inferring that the triple flag indicates that the predetermined block 411 of the picture 12' is to be split into two child blocks 412 and to suppress the decoding of the triple flag from the data stream 14. If the fifth predetermined criterion is fulfilled, the decoding of the one or more further flags 418 comprises inferring that the triple flag indicates that the predetermined block 411 of the picture 12' is to be split into three child blocks 412 and to suppress the decoding of the triple flag from the data stream 14. Further, the apparatus 400 is configure to decode the split direction flag from the data stream 14 by context adaptive entropy decoding using a second context which depends on whether, and discriminates between:

- a first number of criteria among the fourth and fifth predetermined criteria which would be fulfilled in case of a split direction indicated by the split direction flag being horizontal equals a second number of criteria among the fourth and fifth predetermined criteria which would be fulfilled in case of the split direction indicated by the split direction flag being vertical
- the first number being greater than the second number
- the first number being smaller than the second number FIG. 5 illustrates an apparatus 500 for decoding a picture 12' according to an embodiment of the present disclosure. For example the apparatus 500 may be similar to the decoder 20. The apparatus 500 is configured to partition the picture 12' into coding blocks 425 using recursive multi-tree splitting depending on splitting information 415 signaled in a data stream 14. Further, the apparatus 500 is configured to decode the picture 12' from coding information 440 which is signaled in the data stream 14 and relates to the coding blocks 425. The apparatus 500 is configured to partition the picture 12' into the coding blocks 425 depending on splitting information 415 signaled in a data stream 14 by decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425. The quad flag 417 indicates whether the predetermined block 411 of the picture 12' is to be split into four child blocks 412 or not. If the predetermined block 411 of the picture 12' is to be split, but not to be split into four child blocks 412, and if neither a second nor a third predetermined criterion is fulfilled, the partitioning of the picture 12' comprises decoding a split direction flag 518 from the data stream 14 which indicates whether the predetermined block 411 of the picture 12' is to be split vertically or horizontally. If the predetermined block 411 of the picture 12' is to be split, but not to be split into four child blocks 412, and if the second predetermined criterion is fulfilled, the partitioning of the picture 12' comprises inferring that the split direction flag 518 indicates that the predetermined block 411 of the picture 12' is to be split vertically. If the predetermined block 411 of the picture 12' is to be split, but not to be split into four child blocks 412, and if the third predetermined criterion is fulfilled, the partitioning of the picture 12' comprises inferring that the split direction flag 518 indicates that the predetermined block 411 of the picture 12' is to be split horizontally. If the predetermined block 411 of the picture 12' is to be split, but not to be split into four child blocks 412, and if a fourth predetermined criterion is not fulfilled, the partitioning of the picture 12' comprises decoding a triple flag 519 from the data stream 14 which indicates whether the predetermined block 411 of the picture 12' is to be split into three child blocks 412 or into two child blocks 412. If the predetermined block 411 of the picture 12' is to be split, but not to be split into four child blocks 412, and if the fourth predetermined criterion is fulfilled, the partitioning of the picture 12' comprises inferring that the triple flag 519 indicates that the predetermined block 411 of the picture 12' is to be split into two child blocks 412. If the predetermined block 411 of the picture 12' is to be split, the partitioning of the picture 12' comprises resuming the recursive multi-tree splitting for the child blocks 412 using even further flags of the splitting information 415. Further, the apparatus 500 is configured to decode the split direction flag 518 from the data stream 14 by context adaptive entropy decoding using a second context 552 which depends on whether, and discriminates between:

- the fourth predetermined criterion would not neither be fulfilled in case of a split direction indicated by the split direction flag 518 being horizontal nor in case of the split direction indicated by the split direction flag 518 being vertical or be fulfilled both in case of a split direction indicated by the split direction flag 518 being horizontal as well as in case of the split direction indicated by the split direction flag 518 being vertical
- the fourth predetermined criterion would be fulfilled in case of the split direction indicated by the split direction flag 518 being horizontal and not be fulfilled in case of the split direction indicated by the split direction flag 518 being vertical
- the fourth predetermined criterion would not be fulfilled in case of the split direction indicated by the split direction flag 518 being horizontal and be fulfilled in case of the split direction indicated by the split direction flag 518 being vertical FIG. 6 illustrates an apparatus 600 for decoding a picture 12' according to an embodiment of the present disclosure. For example the apparatus 500 may be similar to the decoder 20. Compared to the apparatus 600, the apparatus 500 may additionally use a fifth criterion for inferring a predetermined state of the triple flag 519, and the second context used for decoding the split direction flag 518 may be different.

Figure 7:
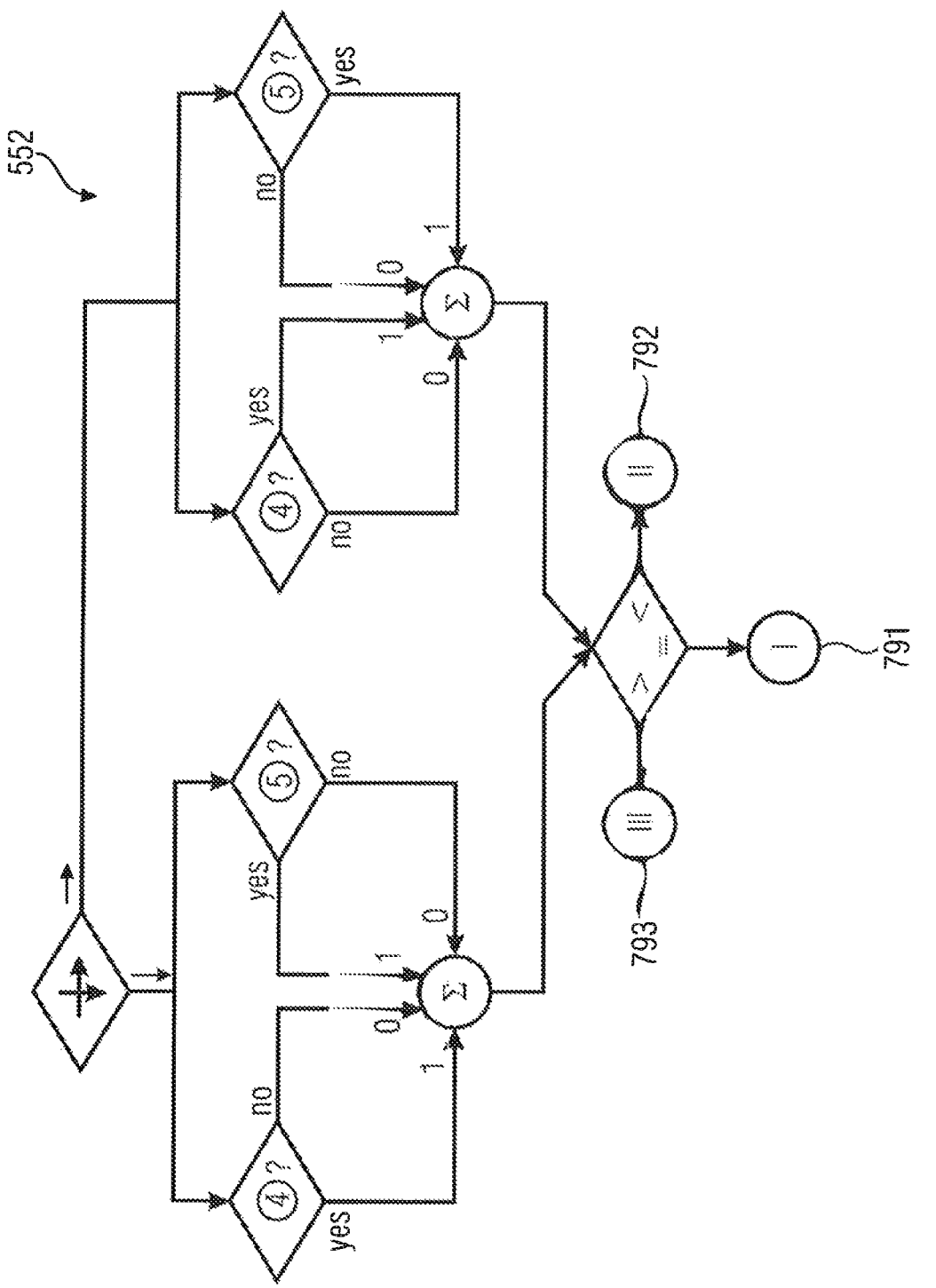
FIG. 7 illustrates an exemplary embodiment of the second context.

The apparatus 600 is configured to partition the picture 12' into coding blocks 425 using recursive multi-tree splitting depending on splitting information 415 signaled in a data stream 14, and further, to decode the picture 12' from coding information 440 which is signaled in the data stream 14 and relates to the coding blocks 425. The apparatus 600 is configured to partition the picture 12' into the coding blocks 425 depending on splitting information 415 signaled in a data stream 14 by decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425. The quad flag 417 indicates whether the predetermined block 411 of the picture 12' is to be split into four child blocks 412 or not. If the predetermined block 411 of the picture 12' is to be split, but not to be split into four child blocks 412, and if neither a second nor a third predetermined criterion is fulfilled, the partitioning of the picture 12' comprises decoding a split direction flag 518 from the data stream 14 which indicates whether the predetermined block 411 of the picture 12' is to be split vertically or horizontally. If the predetermined block 411 of the picture 12' is to be split, but not to be split into four child blocks 412, and if the second predetermined criterion is fulfilled, the partitioning of the picture 12' comprises inferring that the split direction flag 518 indicates that the predetermined block 411 of the picture 12' is to be split vertically. If the predetermined block 411 of the picture 12' is to be split, but not to be split into four child blocks 412, and if the third predetermined criterion is fulfilled, the partitioning of the picture 12' comprises inferring that the split direction flag 518 indicates that the predetermined block 411 of the picture 12' is to be split horizontally. If the predetermined block 411 of the picture 12' is to be split, but not to be split into four child blocks 412, and if a fourth predetermined criterion is not fulfilled, the partitioning of the picture 12' comprises decoding a triple flag 519 from the data stream 14 which indicates whether the predetermined block 411 of the picture 12' is to be split into three child blocks 412 or into two child blocks 412. If the predetermined block 411 of the picture 12' is to be split, but not to be split into four child blocks 412, and if the third predetermined criterion is fulfilled, the partitioning of the picture 12' comprises inferring that the triple flag 519 indicates that the predetermined block 411 of the picture 12' is to be split into two child blocks 412, if the fourth predetermined criterion is fulfilled, and that the triple flag 519 indicates that the predetermined block 411 of the picture 12' is to be split into three child blocks 412 and suppress the decoding of the triple flag 519 from the data stream 14, if a fifth predetermined criterion is fulfilled. If the predetermined block 411 of the picture 12' is to be split, the partitioning of the picture 12' comprises resuming the recursive multi-tree splitting for the child blocks 412 using even further flags of the splitting information 415. The apparatus 600 is further configured to decode the split direction flag 518 from the data stream 14 by context adaptive entropy decoding using a second context 552. According to this embodiment, the second context 552 depends on whether, and discriminates between, a scenario of the following and which of the following scenarios being fulfilled. An exemplary illustration of the scenarios for the second context 552 is shown in FIG. 7.

- a first number of criteria among the fourth and fifth predetermined criteria which would be fulfilled in case of a split direction indicated by the split direction flag 518 being horizontal equals a second number of criteria among the fourth and fifth predetermined criteria which would be fulfilled in case of the split direction indicated by the split direction flag 518 being vertical. This case may be represented by scenario 791 in FIG. 7.
- the first number being greater than the second number. This case may be represented by scenario 792 in FIG. 7.
- the first number being smaller than the second number. This case may be represented by scenario 793 in FIG. 7.

According to an embodiment, the second context 552 additionally depends on whether, and discriminates between,
- a width of the predetermined block 411 equaling a height of the current block
- the width of the predetermined block 411 being larger than the height of the current block
- the width of the predetermined block 411 being smaller than the height of the current block According to an embodiment, if the fourth predetermined criterion would not neither be fulfilled in case of a split direction indicated by the split direction flag 518 being horizontal nor in case of the split direction indicated by the split direction flag 518 being vertical or be fulfilled both in case of a split direction indicated by the split direction flag 518 being horizontal as well as in case of the split direction indicated by the split direction flag 518 being vertical, the second context 552, additionally depends on whether, and discriminates between,
- a width of the predetermined block 411 equaling a height of the current block, e.g. a height of the predetermined block 411
- the width of the predetermined block 411 being larger than the height of the current block, e.g. a height of the predetermined block 411
- the width of the predetermined block 411 being smaller than the height of the current block, e.g. a height of the predetermined block 411

According to this embodiment, if the fourth predetermined criterion would be fulfilled in either one of the case of the split direction indicated by the split direction flag 518 being horizontal and the case of the split direction indicated by the split direction flag 518 being vertical, is non-discriminative between,
- the width of the predetermined block 411 equaling the height of the current block
- the width of the predetermined block 411 being larger than the height of the current block
- the width of the predetermined block 411 being smaller than the height of the current block In other words, in the case of mtt_split_vertical_flag, e.g. the split direction flag 518, a configuration may employ two extra contexts for the cases when the number of possible outcomes for the syntax element is unbalanced. The context modelling, e.g. for the second context, may depend on the following:
- The current width and height
- Availability of the binary horizontal and vertical splits (BH and BV)
- Availability of the ternary horizontal and vertical splits (TH and TV)

Table 3, shown in FIG. 21, shows an exemplary context modeling for the mtt_split_vertical_flag syntax element, as may be employed for the second context for decoding the split direction flag 518. W and H describe the width and height of the current node. BH, TH, BV and TV describe the availability of the binary and ternary horizontal and vertical syntax elements. If either BH+TH or BV+TV is equal to 0, the syntax element's value can be inferred and no context modeling is required.

Alternatively, another dependency that may be exploited for better context modelling of the mtt_split_vertical_flag, e.g. the split direction flag 518, is the size in relation to the above and left neighbors. Under the assumption that the block sizes are locally correlated, a split that subdivides the block into parts shaped more alike the neighbors might be more probable than other splits. A simple formulation of this dependency can be implemented based of the following two variables: $d_0 = w/w_{above}$, $d_1 = h/h_{left}$ (with w and h being current width and height, $w_{above}$ the width of the above neighbor block, and $h_{left}$ the height of the left neighbor block). The alternative context modelling for the mtt_split_vertical_flag depends on the following:
- Left and above neighbor availability
- The current width and height
- The height of the left neighbor
- The width of the above neighbor
- Availability of the binary horizontal and vertical splits (BH and BV)
- Availability of the ternary horizontal and vertical splits (TH and TV)

Table 4, shown in FIG. 22, shows an example of such a context modeling for the mtt_split_vertical_flag based on split availability and current blocks shape similarity to neighboring CUs shapes (expressed by $d_0$ and $d_1$ as described above). For example, the shown context modelling may be applied for the second context for decoding the split direction flag 518.

Accordingly, according to an embodiment, the second context 552 additionally depends on whether, and discriminates between,
- a first ratio between a width of the predetermined block 411 and a width of a coding block above the predetermined block 411 equaling a second ratio between a height of the current block and a height of a coding block to the left of the predetermined block 411
- the first ratio being larger than the second ratio
- the first ratio being smaller than the second ratio According to an embodiment, if the fourth predetermined criterion would not neither be fulfilled in case of a split direction indicated by the split direction flag 518 being horizontal nor in case of the split direction indicated by the split direction flag 518 being vertical or be fulfilled both in case of a split direction indicated by the split direction flag 518 being horizontal as well as in case of the split direction indicated by the split direction flag 518 being vertical, the second context 552, additionally depends on whether, and discriminates between,
- a first ratio between a width of the predetermined block 411 and a width of a coding block above the predetermined block 411 equaling a second ratio between a height of the current block and a height of a coding block to the left of the predetermined block 411
- the first ratio being larger than the second ratio
- the first ratio being smaller than the second ratio According to this embodiment, if the fourth predetermined criterion would be fulfilled in either one of the case of the split direction indicated by the split direction flag 518 being horizontal and the case of the split direction indicated by the split direction flag 518 being vertical, the second context 552, is non-discriminative between,
- a first ratio between a width of the predetermined block 411 and a width of a coding block above the predetermined block 411 equaling a second ratio between a height of the current block and a height of a coding block to the left of the predetermined block 411
- the first ratio being larger than the second ratio
- the first ratio being smaller than the second ratio According to an embodiment, the second context 552 is non-discriminative between,
- whether the fourth predetermined criterion would neither be fulfilled in case of the split direction indicated by the split direction flag 518 being horizontal nor in case of the split direction indicated by the split direction flag 518 being vertical and
- whether the fourth predetermined criterion would be fulfilled both in case of a split direction indicated by the split direction flag 518 being horizontal as well as in case of the split direction indicated by the split direction flag 518 being vertical.

According to an embodiment, the apparatus 400;500;600 is configured to decode the triple flag 519 from the data stream 14 by context adaptive entropy decoding using a third context which depends on a number of splits of the recursive multi-tree splitting using which the predetermined block 411 is obtained, or a size of the predetermined block 411.

According to an embodiment, the apparatus 400;500;600 is configured to decode the triple flag 519 from the data stream 14 by context adaptive entropy decoding using a third context which depends on whether, and discriminates between, the split direction flag 518 indicating a horizontal split direction, and the split direction flag 518 indicating a vertical split direction.

In other words, a configuration for mtt_split_binary_flag, e.g. the triple flag 519, may use different context models depending on the previously signaled or inferred information (as mtt_split_binary_flag follows the mtt_split_vertical_flag in both shown binarization schemes, e.g. the schemes shown in FIGS. 11 and 12) and the current partitioning tree state, as summarized in Table 5, shown in FIG. 23. The context modeling for the flag, e.g. the triple flag 519, may depends on the following:

The current BT-depth (number of non-QT splits up to the current node)
  Alternatively, BT depth might calculated as follows (in terms of current QT-depth $d_{QT}$, CTU size $W_{CTU}$ and current width and height):

$$d_{BT}=\log_2((W_{CTU}\,W_{CTU})/(W_{curr}\,H_{curr}))-2\cdot d_{QT}$$

The value of the previously signaled or inferred flag mtt_split_vertical_flag for the current node Table 5, shown in FIG. 23, shows an exemplarily context modeling for the mtt_split_binary_flag syntax element, e.g. the triple flag 519. The binary tree depth (BT-depth) describes the number of binary splits or its equivalent of the current node, e.g. the current recursion of the recursive splitting. The value in the row mtt_split_vertical_flag describes the value signaled or inferred at the current partitioning level prior to the coding of the syntax element mtt_split_binary_flag.

Figure 8:
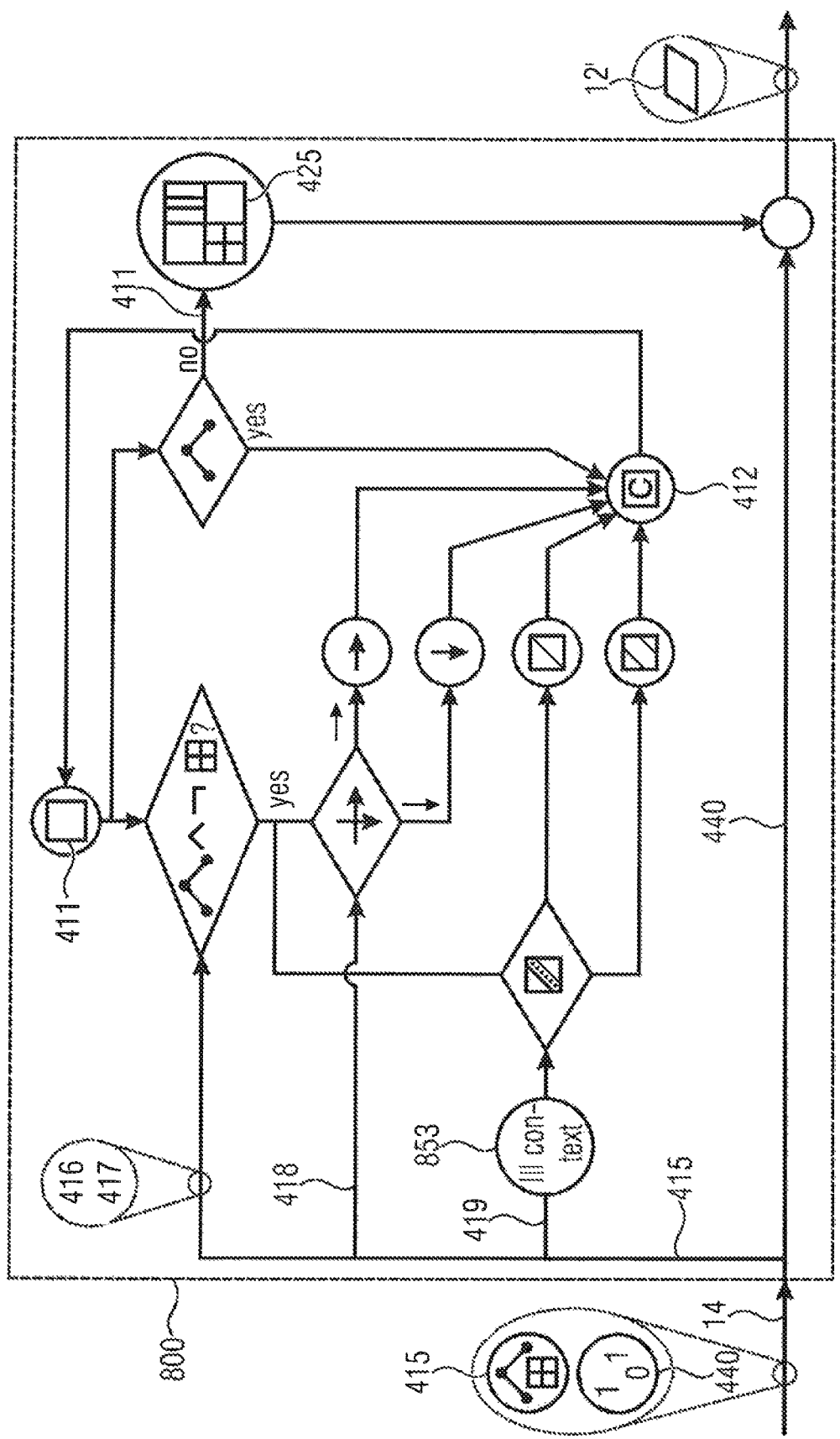
FIG. 8 shows a schematic representation of an apparatus for decoding a picture according to a further embodiment.

FIG. 8 illustrates an apparatus 800 for decoding a picture 12' according to an embodiment of the present disclosure. For example the apparatus 800 may be similar to the decoder 20. The apparatus 800 for decoding a picture 12' is configured to partition the picture 12' into coding blocks 425 using recursive multi-tree splitting depending on splitting information 415 signaled in a data stream 14, and further, to decode the picture 12' from coding information 440 which is signaled in the data stream 14 and relates to the coding blocks 425. The the apparatus 800 is configured to partition the picture 12' into the coding blocks 425 depending on splitting information 415 signaled in a data stream 14 by decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425. The quad flag 417 indicates whether the predetermined block 411 of the picture 12' is to be split into four child blocks 412 or not. If the predetermined block 411 of the picture 12' is to be split, but not to be split into four child blocks 412, the partitioning of the picture 12' comprises decoding a split direction flag 518 from the data stream 14 which indicates whether the predetermined block 411 of the picture 12' is to be split vertically or horizontally, and further comprises decoding a triple flag 519 from the data stream 14 which indicates whether the predetermined block 411 of the picture 12' is to be split into three child blocks 412 or into two child blocks 412. If the predetermined block 411 of the picture 12' is to be split, the partitioning of the picture 12' comprises resuming the recursive multi-tree splitting for the child blocks 412 using even further flags of the splitting information 415. The apparatus 800 is further configured to decode the triple flag 519 from the data stream 14 by context adaptive entropy decoding using a third context 853 which depends on a number of splits of the recursive multi-tree splitting using which the predetermined block 411 is obtained, or a size of the predetermined block 411. Additionally or alternatively, the third context 853 depends on whether, and discriminates between, the split direction flag 518 indicating a horizontal split direction, and the split direction flag 518 indicating a vertical split direction.

Figure 9:
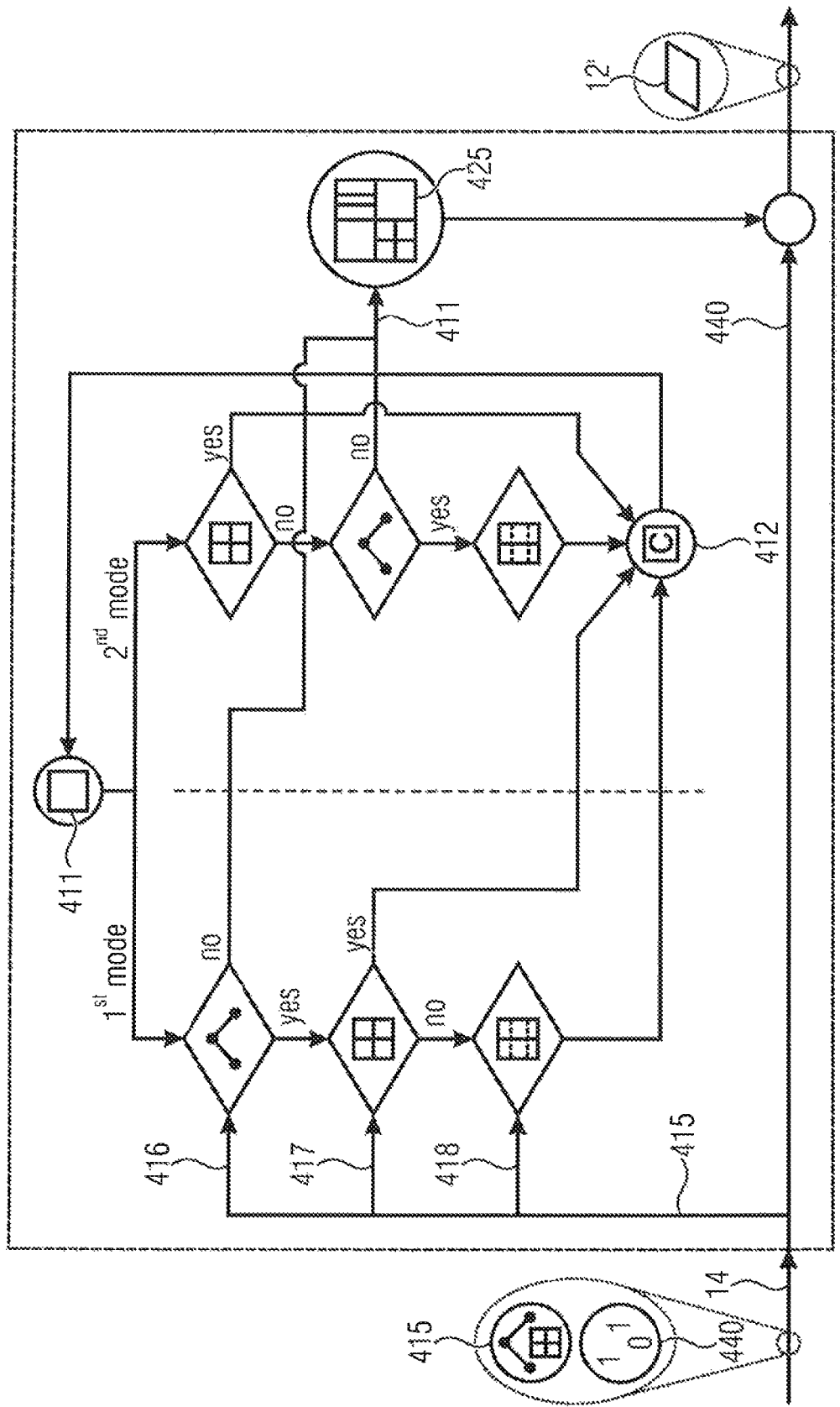
FIG. 9 shows a schematic representation of an apparatus for decoding a picture according to a further embodiment, FIGS. 10A, B illustrate a quadtree split according to an embodiment.

FIG. 9 illustrates an apparatus 900 for decoding a picture 12' according to an embodiment of the present disclosure. For example the apparatus 900 may be similar to the decoder 20.40. The apparatus 900 is configured to partition the picture 12' into coding blocks 425 using recursive multi-tree splitting depending on splitting information 415 signaled in a data stream 14, and further to decode the picture 12' from coding information 440 which is signaled in the data stream 14 and relates to the coding blocks 425. The apparatus 900 is configured to partition the picture 12' into the coding blocks 425 depending on splitting information 415 signaled in a data stream 14 by decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425. The quad flag 417 indicates whether the predetermined block 411 of the picture 12' is to be split into four child blocks 412 or not. If the predetermined block 411 of the picture 12' is to be split, but not to be split into four child blocks 412, partitioning the picture 12' comprises decoding one or more further flags 418 of the splitting information 415 from the data stream 14 which indicate whether the predetermined block 411 of the picture 12' is to be split into two or three child blocks 412 vertically or horizontally. If the predetermined block 411 of the picture 12' is to be split, partitioning the picture 12' comprises resuming the recursive multi-tree splitting for the child blocks 412 using even further flags of the splitting information 415. The apparatus 900 is further configured to select one of a first mode and a second mode. Operating in the first mode, the apparatus 900 is configured to decode the quad flag 417 after the split flag 416 if the split flag 416 indicates that the predetermined block 411 of the picture 12' is to be split. Operating in the second mode, the apparatus 900 is configured to decode the split flag 416 after the quad flag 417 if the quad flag 417 indicates that the predetermined child block of the picture 12' is not to be split into four child blocks 412.

For example, due to the availability constraints, the existing partitioning tree, e.g. the tree 1100, already uses an adaptive tree structure. The interchanging of the shape type and the direction also uses an adaptive partitioning tree. Generally, the ordering of the syntax elements reflects a fixed probability at each given node. However, the probability varies depending on the signal characteristic and the operation point of the codec. For example, larger quantization parameters, i.e., low bit rate operation points, tend to results in larger leaf nodes. In such a case, a split is less probable, hence, the configuration in FIG. 12 is advantageous. However, at the other end of the operation point, the split information is often positive, hence, the configuration in FIG. 11 is advantageous. An adaptive partitioning tree configuration would allow both partitioning tree signaling binarizations and switch between the two options depending on the contextual characteristics. An extension would hold several different partitioning trees and switch among the trees depending on either the neighboring partitioning trees (backward-adaptive) or a syntax element in at the root specifies the partitioning tree (forward-adaptive).

Thus, according to an embodiment, the apparatus 900 is configured to perform the selection depending on a mode signalization in the data stream 14. In other words, the selection may be forward-adaptive.

According to an alternative embodiment, the apparatus 900 is configured to perform the selection backward adaptively.

For example, according to an embodiment, the apparatus 900 is configured to perform the selection depending on an evaluation of one or more of
- block sizes of a set of previous coding blocks 425, e.g. coding blocks of the coding block 425 that resulted from a previous partitioning of a block or a part of the picture 12', for example a previously partitioned CTU or a neighboring CTU. For example, this option may be realized using a sliding window.
- number of splits from which a set of previously coding blocks 425 results
- a quantization parameter signaled in the data stream 14

According to embodiments, the syntax elements, e.g. the flags, are coupled to the depth in terms of the nested partitioning tree. According to further embodiments, a combined depth unifies the information, e.g. the depth information, so that the context modeling for the syntax elements related to the partitioning tree rely only on a single depth value. The most straightforward realization may be a single depth value that is increased after each split. Alternatively, the depth may be weighted depending on the split type. For example, a QT depth may contribute a fixed positive value to the depth counter, whereas a binary split only contributes a weighted number of the fixed positive value of the quadtree, with the weight w≤1.

According to embodiments, the binary tree and the ternary tree are coupled, i.e., the direction of the partitioning is signaled first followed by the information whether the resulting partitions are binary or ternary. In some circumstances, there is a shift in probability for the direction given the finale shape type. A configuration of the presented invention may adaptively interchange the two syntax elements and incorporates the information into the context modeling.

A further extension to the adaptive partitioning tree concept is the adaptive signaling of the shape size, either backward-adaptively or forward-adaptively. For example, when a 16×16 block is binary horizontal split, the result can be a 16×4 and a 16×12 shapes, or two 16×8 shapes. In the current VVC draft, the final ratio is fixed. A configuration that exploits the shape size can analyze the neighboring partition trees and decide which shape size should be used. Note that the extension is the same as additional partition trees that are available in the case on an adaptive partitioning scheme.

The features and embodiments described in the context of a decoder, may equally applied in an encoder. Accordingly, embodiments provide an apparatus for encoding a picture, for example the apparatus 1300 illustrated in FIG. 13. The apparatus 1300 for encoding a picture 12 is configured to partition the picture 12 into coding blocks 425 using recursive multi-tree splitting. The encoder is configured to encode splitting information 415 defining the partitioning in a data stream 14. Further, the apparatus 1300 is configured to encode the picture 12 into coding information 440 which relates to the coding blocks 425 and encode the coding information 440 in the data stream 14. The recursive multi-tree splitting for partitioning the picture 12 into the coding blocks 425 may be performed by any embodiment of the recursive multi-tree splitting as described with respect to the decoders 400;500;600;800;900, that is, the coding blocks 425 may be provided by said recursive multi-tree splitting. Similarly, the splitting information may be provided by the recursive multi-tree splitting. The number and the type of flags, the encoder 1300 encodes for obtaining the splitting information 415 may depend on the respective embodiment of the recursive splitting. For example, the encoding of the splitting information 415 is specific to a current recursion of the recursive splitting, depending on a partitioning of a predetermined block 411 which is subject to the current recursion of the recursive splitting. That is, referring to the embodiments of the recursive splitting described with respect to the decoders 400;500;600;800;900, whenever the partitioning of the picture 12 implies a decoding of a predetermined flag, the apparatus 1300 is configured for encoding the predetermined flag into the data stream 14. For example, whenever the partitioning or the picture implies to infer a predetermined flag, the encoder is not necessarily configured to encode the predetermined flag, but may be configured to suppress an encoding of the predetermined flag.

Figure 14:
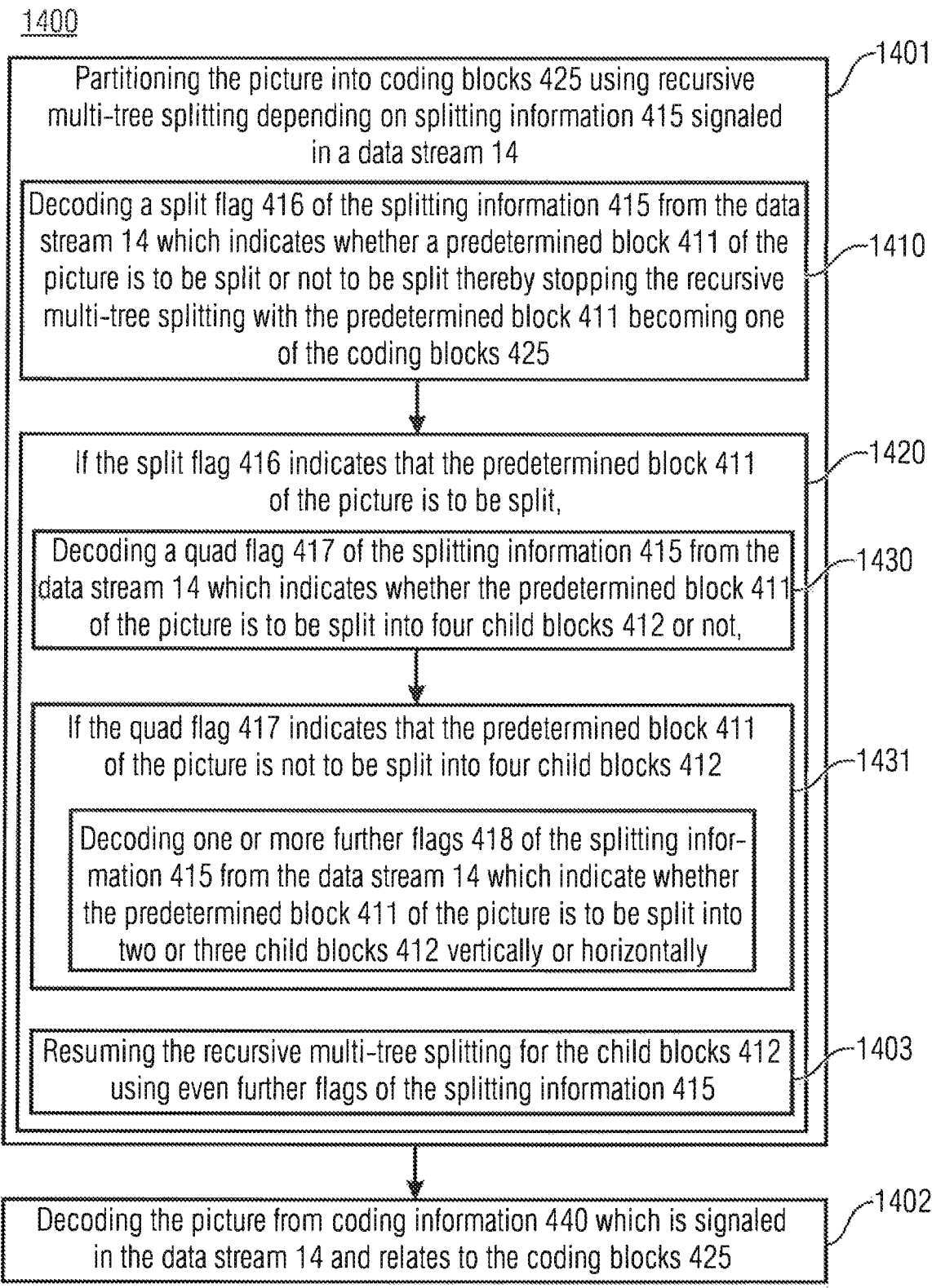
FIG. 14 shows a flow chart of an embodiment of a method for decoding a picture.

FIG. 14 shows a flow chart of a method 1400 for decoding a picture 12' according to an embodiment. For example, method 1400 may be performed by the apparatus 400. The method comprises partitioning 1401 the picture 12' into coding blocks 425 using recursive multi-tree splitting depending on splitting information 415 signaled in a data stream 14. The method 1400 further comprises a step 1402 of decoding the picture 12' from coding information 440 which is signaled in the data stream 14 and relates to the coding blocks 425. The step 1401 comprises decoding a split flag 416 of the splitting information 415 from the data stream 14 which indicates whether a predetermined block 411 of the picture 12' is to be split or not to be split thereby stopping the recursive multi-tree splitting with the predetermined block 411 becoming one of the coding blocks 425. The step 1401 further comprises a step 1420, which is performed if the split flag 416 indicates that the predetermined block 411 of the picture 12' is to be split. The step 1420 comprises a step 1430 of decoding a quad flag 417 of the splitting information 415 from the data stream 14 which indicates whether the predetermined block 411 of the picture 12' is to be split into four child blocks 412 or not. The step 1420 further comprises a step 1431, which is performed if the quad flag 417 indicates that the predetermined block 411 of the picture 12' is not to be split into four child blocks 412. The step 1431 comprises decoding one or more further flags 418 of the splitting information 415 from the data stream 14 which indicate whether the predetermined block 411 of the picture 12' is to be split into two or three child blocks 412 vertically or horizontally. The step 1420 further comprises resuming the recursive multi-tree splitting for the child blocks 412 using even further flags of the splitting information 415.

Figure 15:
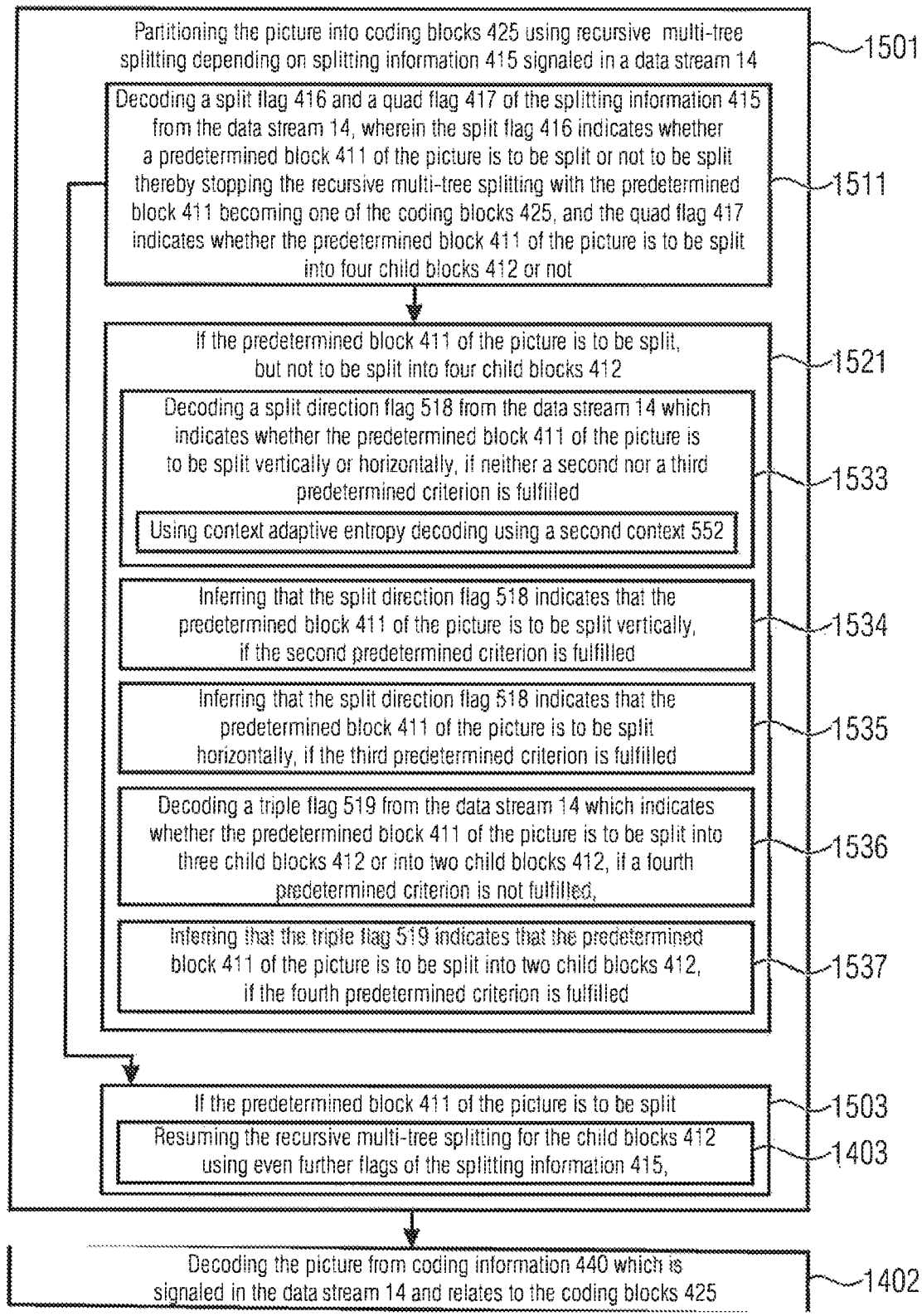
FIG. 15 shows a flow chart of an embodiment of a method for decoding a picture.

FIG. 15 shows a flow chart of a method 1500 for decoding a picture 12' according to an embodiment. For example, method 1500 may be performed by the apparatus 500. The method comprises partitioning 1501 the picture 12' into coding blocks 425 using recursive multi-tree splitting depending on splitting information 415 signaled in a data stream 14. The method 1500 further comprises step 1402. The step 1501 comprises a step 1511 of decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425, and the quad flag 417 indicates whether the predetermined block 411 of the picture 12' is to be split into four child blocks 412 or not. The step 1501 further comprises a step 1521, which is performed if the predetermined block 411 of the picture 12' is to be split, but not to be split into four child blocks 412. The step 1521 comprises the step 1533 of decoding a split direction flag 518 from the data stream 14 which indicates whether the predetermined block 411 of the picture 12' is to be split vertically or horizontally, if neither a second nor a third predetermined criterion is fulfilled. The decoding 1533 of the split direction flag 518 uses a second context 552 which depends on whether, and discriminates between, the fourth predetermined criterion would not neither be fulfilled in case of a split direction indicated by the split direction flag 518 being horizontal nor in case of the split direction indicated by the split direction flag 518 being vertical or be fulfilled both in case of a split direction indicated by the split direction flag 518 being horizontal as well as in case of the split direction indicated by the split direction flag 518 being vertical the fourth predetermined criterion would be fulfilled in case of the split direction indicated by the split direction flag 518 being horizontal and not be fulfilled in case of the split direction indicated by the split direction flag 518 being vertical the fourth predetermined criterion would not be fulfilled in case of the split direction indicated by the split direction flag 518 being horizontal and be fulfilled in case of the split direction indicated by the split direction flag 518 being vertical The step 1521 further comprises the step 1534 of inferring that the split direction flag 518 indicates that the predetermined block 411 of the picture 12' is to be split vertically, if the second predetermined criterion is fulfilled. The step 1521 further comprises the step 1535 of inferring that the split direction flag 518 indicates that the predetermined block 411 of the picture 12' is to be split horizontally, if the third predetermined criterion is fulfilled. The step 1521 further comprises the step 1536 of decoding a triple flag 519 from the data stream 14 which indicates whether the predetermined block 411 of the picture 12' is to be split into three child blocks 412 or into two child blocks 412, if a fourth predetermined criterion is not fulfilled. The step 1521 further comprises the step 1537 of inferring that the triple flag 519 indicates that the predetermined block 411 of the picture 12' is to be split into two child blocks 412, if the fourth predetermined criterion is fulfilled. The step 1501 further comprises the step 1503. The step 1503 performs step 1403, if the predetermined block 411 of the picture 12' is to be split.

FIG. 16 shows a flow chart of a method 1600 for decoding a picture 12' according to an embodiment. For example, method 1600 may be performed by the apparatus 600. The method comprises partitioning 1601 the picture 12' into coding blocks 425 using recursive multi-tree splitting depending on splitting information 415 signaled in a data stream 14. The method 1600 further comprises the step 1402. The step 1601 comprises the step 1511. The step 1601 further comprises a step 1622 which is performed if the predetermined block 411 of the picture 12' is to be split, but not to be split into four child blocks 412. The step 1622 comprises the steps 1661, 1534, 1535, 1536 and 1662. The step 1661 comprises decoding a split direction flag 518 from the data stream 14 which indicates whether the predetermined block 411 of the picture 12' is to be split vertically or horizontally, if neither a second nor a third predetermined criterion is fulfilled. The decoding 1661 of the split direction flag 518 comprises using a second context 552. The configuration of the second context 552 as used by the method 1600 or the apparatus 600 may differ from the configuration of the second context 552 as used by the method 1500 or the apparatus 500. In case of the method 1600 and the apparatus 600, the second context depends on whether, and discriminates between:
- a first number of criteria among the fourth and fifth predetermined criteria which would be fulfilled in case of a split direction indicated by the split direction flag 518 being horizontal equals a second number of criteria among the fourth and fifth predetermined criteria which would be fulfilled in case of the split direction indicated by the split direction flag 518 being vertical
- the first number being greater than the second number
- the first number being smaller than the second number The step 1662 comprises inferring that the triple flag 519 indicates that the predetermined block 411 of the picture 12' is to be split into two child blocks 412, if the fourth predetermined criterion is fulfilled, and that the triple flag 519 indicates that the predetermined block 411 of the picture 12' is to be split into three child blocks 412 and suppress the decoding of the triple flag 519 from the data stream 14, if a fifth predetermined criterion is fulfilled. Step 1601 further comprises the step 1503.

FIG. 17 shows a flow chart of a method 1800 for decoding a picture 12' according to an embodiment. For example, method 1800 may be performed by the apparatus 800. The method comprises partitioning 1801 the picture 12' into coding blocks 425 using recursive multi-tree splitting depending on splitting information 415 signaled in a data stream 14. The method 1800 further comprises the step 1402. The step 1801 comprises the step 1511. The step 1801 further comprises a step 1823 which is performed if the predetermined block 411 of the picture 12' is to be split, but not to be split into four child blocks 412. The step 1823 comprises the step 1881 of decoding a split direction flag 518 from the data stream 14 which indicates whether the predetermined block 411 of the picture 12' is to be split vertically or horizontally. The step 1823 further comprises the step 1882 of decoding a triple flag 519 from the data stream 14 which indicates whether the predetermined block 411 of the picture 12' is to be split into three child blocks 412 or into two child blocks 412. Step 1801 further comprises the step 1503.

FIG. 18 shows a flow chart of a method 1900 for decoding a picture 12' according to an embodiment. For example, method 1900 may be performed by the apparatus 900. The method comprises partitioning 1901 the picture 12' into coding blocks 425 using recursive multi-tree splitting depending on splitting information 415 signaled in a data stream 14. The method 1900 further comprises the step 1402. The step 1901 comprises the step 1911 decoding a split flag 416 and a quad flag 417 of the splitting information 415 from the data stream 14, wherein the split flag 416 indicates whether a predetermined block 411 of the picture 12' is to be split or not to be split thereby stopping the recursive multi-tree splitting with the predetermined block 411 becoming one of the coding blocks 425, and the quad flag 417 indicates whether the predetermined block 411 of the picture 12' is to be split into four child blocks 412 or not. The step 1901 further comprises a step 1905 of selecting one of a first mode and a second mode. In the first mode, the method 1900 comprises, for example during the step 1911, decoding the quad flag 417 after the split flag 416 if the split flag 416 indicates that the predetermined block 411 of the picture 12' is to be split. In the second mode, the method 1900 comprises, for example during the step 1911, decoding the split flag 416 after the quad flag 417 if the quad flag 417 indicates that the predetermined child block of the picture 12' is not to be split into four child blocks 412. The step 1901 comprises a step 1991, which is performed if the predetermined block 411 of the picture 12' is to be split, but not to be split into four child blocks 412. The step 1991 comprises decoding one or more further flags 418 of the splitting information 415 from the data stream 14 which indicate whether the predetermined block 411 of the picture 12' is to be split into two or three child blocks 412 vertically or horizontally. The step 1901 further comprises the step 1503.

Further embodiments provide methods for encoding a picture 12. The methods for encoding a picture comprise partitioning of the picture 12 into coding blocks 425 using recursive multi-tree splitting and a encoding of splitting information 415 defining the partitioning in a data stream 14. The methods further comprise a encoding of the picture 12 into coding information 440 which relates to the coding blocks 425 and encode the coding information 440 in the data stream 14. Similarly to the correspondence between the encoders and the decoders described above, the methods for encoding a picture resemble the methods 1400, 1500, 1600, 1800, 1900. For example, the partitioning of the picture 12 relies on the same steps as described with respect to these methods. That is, whenever a flag is to be decoded, the methods for encoding comprise encoding the respective flag. Steps of the methods 1400, 1500, 1600, 1800, 1900 that comprise inferring a flag, are not necessarily part of the method for encoding a picture, but, instead, the methods may comprise suppressing an encoding of the flag.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer pro-gram product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer pro-gram for performing one of the methods described herein.

A further embodiment according to the invention comprises an apparatus or a system configured to transfer (for example, electronically or optically) a computer program for per-forming one of the methods described herein to a receiver. The receiver may, for example, be a computer, a mobile device, a memory device or the like. The apparatus or sys-tem may, for example, comprise a file server for transferring the computer program to the receiver.

In some embodiments, a programmable logic device (for example a field programmable gate array) may be used to perform some or all of the functionalities of the methods de-scribed herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding a picture, the apparatus comprising: at least one processor configured to perform operations comprising:
receiving, via a data stream, splitting information corresponding to a predetermined block;
determining, from the splitting information, a split flag that indicates that the predetermined block of the picture is to be split;
determining, from the splitting information, a split direction flag that indicates whether the predetermined block of the picture is to be split vertically or horizontally, wherein the split direction flag has a value of 0 or 1; and
decoding a ternary split flag from the data stream that indicates whether the predetermined block of the picture is to be split into three child blocks or into two child blocks, wherein the ternary split flag is decoded from the data stream by context adaptive entropy coding using a context index that is determined using both: 1) the split direction flag, and 2) a tree depth corresponding to the predetermined block,
wherein the determined context index has a first value when the tree depth is less than 2 and the split direction flag has a value of 0,
wherein the context index has a second value when the tree depth is less than 2 and the split direction flag has a value of 1,
wherein the context index has a third value when the tree depth is greater than or equal to 2 and the split direction flag has a value of 0,
wherein the context index has a fourth value when the tree depth is greater than or equal to 2 and the split direction flag has a value of 1, and
wherein the first value, the second value, the third value, and the fourth value are each a different value.

2. The apparatus of claim 1, wherein determining the split flag comprises decoding the split flag from the data stream, and
wherein, after decoding the split flag from the data stream, the operations further comprise decoding a quadtree split flag from the data stream, the quadtree split flag indicating whether or not the predetermined block of the picture is to be split into four child blocks.

3. The apparatus of claim 1, the operations further comprising determining, from the splitting information, a quadtree split flag that indicates that the predetermined block of the picture is not to be split into four child blocks.

4. The apparatus of claim 1, the operations further comprising inferring the split direction flag based at least in part on whether at least one of:
halving the predetermined block horizontally would yield a width falling below a predetermined minimum dimension; or
halving the predetermined block vertically would yield a height falling below the predetermined minimum dimension.

5. The apparatus of claim 1, wherein determining the split flag comprises decoding or inferring the split flag from the splitting information signaled via the data stream.

6. The apparatus of claim 1, wherein determining the split direction flag comprises decoding or inferring the split direction flag from the splitting information signaled via the data stream.

7. An apparatus for encoding a picture, the apparatus comprising: at least one processor configured to perform operations comprising:
encoding, into a data stream, splitting information corresponding to a predetermined block, the splitting information indicating:
a split flag that indicates that the predetermined block of the picture is to be split; and a split direction flag that indicates whether the predetermined block of the picture is to be split vertically or horizontally, wherein the split direction flag has a value of 0 or 1; and encoding a ternary split flag into the data stream that indicates whether the predetermined block of the picture is to be split into three child blocks or into two child blocks, wherein the ternary split flag is encoded into the data stream by context adaptive entropy coding using a context index that is determined using both: 1) the split direction flag, and 2) a tree depth corresponding to the predetermined block, wherein the determined context index has a first value when the tree depth is less than 2 and the split direction flag has a value of 0, wherein the context index has a second value when the tree depth is less than 2 and the split direction flag has a value of 1, wherein the context index has a third value when the tree depth is greater than or equal to 2 and the split direction flag has a value of 0, wherein the context index has a fourth value when the tree depth is greater than or equal to 2 and the split direction flag has a value of 1, and wherein the first value, the second value, the third value, and the fourth value are each a different value.

8. The apparatus of claim 7, wherein encoding the splitting information includes encoding the split flag into the data stream, and wherein, after encoding the split flag into the data stream, the operations further comprise encoding a quadtree split flag into the data stream, the quadtree split flag indicating whether or not the predetermined block of the picture is to be split into four child blocks.

9. The apparatus of claim 7, wherein the splitting information further indicates a quadtree split flag that indicates that the predetermined block of the picture is not to be split into four child blocks.

10. The apparatus of claim 7, the operations further comprising encoding the splitting information indicating the split direction flag based at least in part on whether at least one of:

halving the predetermined block horizontally would yield a width falling below a predetermined minimum dimension; or halving the predetermined block vertically would yield a height falling below the predetermined minimum dimension.

11. A method for decoding a picture, the method comprising:

receiving, via a data stream, splitting information corresponding to a predetermined block;

determining, from the splitting information, a split flag that indicates that the predetermined block of the picture is to be split;

determining, from the splitting information, a split direction flag that indicates whether the predetermined block of the picture is to be split vertically or horizontally, wherein the split direction flag has a value of 0 or 1; and decoding a ternary split flag from the data stream that indicates whether the predetermined block of the picture is to be split into three child blocks or into two child blocks, wherein the ternary split flag is decoded from the data stream by context adaptive entropy coding using a context index that has been determined using both: 1) the split direction flag, and 2) a tree depth corresponding to the predetermined block, wherein the determined context index has a first value when the tree depth is less than 2 and the split direction flag has a value of 0, wherein the context index has a second value when the tree depth is less than 2 and the split direction flag has a value of 1, wherein the context index has a third value when the tree depth is greater than or equal to 2 and the split direction flag has a value of 0, wherein the context index has a fourth value when the tree depth is greater than or equal to 2 and the split direction flag has a value of 1, and wherein the first value, the second value, the third value, and the fourth value are each a different value.

12. The method of claim 11, wherein determining the split flag comprises decoding the split flag from the data stream, and wherein, after decoding the split flag from the data stream, the method further comprises decoding a quadtree split flag from the data stream, the quadtree split flag indicating whether or not the predetermined block of the picture is to be split into four child blocks.

13. The method of claim 11, further comprising determining, from the splitting information, a quadtree split flag that indicates that the predetermined block of the picture is not to be split into four child blocks.

14. The method of claim 11, further comprising inferring the split direction flag based at least in part on whether at least one of:

halving the predetermined block horizontally would yield a width falling below a predetermined minimum dimension; or halving the predetermined block vertically would yield a height falling below the predetermined minimum dimension.

15. The method of claim 11, wherein determining the split flag comprises decoding or inferring the split flag from the splitting information signaled via the data stream.

16. The method of claim 11, wherein determining the split direction flag comprises decoding or inferring the split direction flag from the splitting information signaled via the data stream.

17. A non-transitory computer-readable medium including instructions which, when executed by at least one processor, cause the at least one processor to perform the method of claim 11.

18. A method for encoding a picture, the method comprising:

encoding, into a data stream, splitting information corresponding to a predetermined block, the splitting information indicating:

a split flag that indicates that the predetermined block of the picture is to be split; and a split direction flag that indicates whether the predetermined block of the picture is to be split vertically or horizontally, wherein the split direction flag has a value of 0 or 1; and encoding a ternary split flag into the data stream that indicates whether the predetermined block of the picture is to be split into three child blocks or into two child blocks, wherein the ternary split flag is encoded into the data stream by context adaptive entropy coding using a context index that has been determined using both: 1) the split direction flag, and 2) a tree depth corresponding to the predetermined block, wherein the determined context index has a first value when the tree depth is less than 2 and the split direction flag has a value of 0, wherein the context index has a second value when the tree depth is less than 2 and the split direction flag has a value of 1, wherein the context index has a third value when the tree depth is greater than or equal to 2 and the split direction flag has a value of 0, wherein the context index has a fourth value when the tree depth is greater than or equal to 2 and the split direction flag has a value of 1, and wherein the first value, the second value, the third value, and the fourth value are each a different value.

19. The method of claim 18, wherein encoding the splitting information includes encoding the split flag into the data stream, and wherein, after encoding the split flag into the data stream, the method further comprises encoding a quadtree split flag into the data stream, the quadtree split flag indicating whether or not the predetermined block of the picture is to be split into four child blocks.

20. The method of claim 18, wherein the splitting information further indicates a quadtree split flag that indicates that the predetermined block of the picture is not to be split into four child blocks.

21. The method of claim 18, further comprising encoding the splitting information indicating the split direction flag based at least in part on whether at least one of:

halving the predetermined block horizontally would yield a width falling below a predetermined minimum dimension; or halving the predetermined block vertically would yield a height falling below the predetermined minimum dimension.

22. A non-transitory computer-readable medium including instructions which, when executed by at least one processor, cause the at least one processor to perform the method of claim 18.

23. The apparatus of claim 1, wherein the determined context index has a value of 0, 1, 2, or 3.

* * * * *